US012533692B2

(12) United States Patent
Nose

(10) Patent No.: US 12,533,692 B2
(45) Date of Patent: Jan. 27, 2026

(54) GAS TRANSFER TYPE ULTRASONIC GUSHING FINE POWDER QUANTITATIVE FEEDING SYSTEM AND GAS TRANSFER TYPE ULTRASONIC GUSHING FINE POWDER QUANTITATIVE FEEDING METHOD

(71) Applicant: KINBOSHI INC., Tokyo (JP)

(72) Inventor: Atsushi Nose, Aichi (JP)

(73) Assignee: KINBOSHI INC., Tokyo (JP)

( * ) Notice: Subject to any disclaimer, the term of this patent is extended or adjusted under 35 U.S.C. 154(b) by 186 days.

(21) Appl. No.: 18/033,511

(22) PCT Filed: Jun. 20, 2022

(86) PCT No.: PCT/JP2022/024608
§ 371 (c)(1),
(2) Date: Apr. 24, 2023

(87) PCT Pub. No.: WO2023/282044
PCT Pub. Date: Jan. 12, 2023

(65) Prior Publication Data

US 2024/0299963 A1 Sep. 12, 2024

(30) Foreign Application Priority Data

Jul. 6, 2021 (JP) ................................ 2021-112107

(51) Int. Cl.
*B05B 7/14* (2006.01)
*B65G 53/42* (2006.01)

(52) U.S. Cl.
CPC .......... *B05B 7/1472* (2013.01); *B05B 7/1445* (2013.01); *B65G 53/42* (2013.01); *B65G 2201/042* (2013.01)

(58) Field of Classification Search
CPC ...... B05B 7/1472; B05B 7/1445; B65G 53/42
See application file for complete search history.

(56) References Cited

U.S. PATENT DOCUMENTS 4,627,990 A 12/1986 Saga et al.
11,554,925 B2 1/2023 Kimura et al.
(Continued)

FOREIGN PATENT DOCUMENTS

JP 60-187668 9/1985
JP H0724415 A 1/1995
(Continued)

OTHER PUBLICATIONS

Taiwanese Patent Application No. 111124004, Office Action, dated May 25, 2023.
(Continued)

*Primary Examiner* — Nathan T Leong
(74) *Attorney, Agent, or Firm* — MARSHALL, GERSTEIN & BORUN LLP; Andrew M. Lawrence

(57) ABSTRACT

The present invention provides a method for quantitatively and stably supplying fine powder and a system for implementing the method. In this invention, in a state in which at least part of the ultrasonic vibration gushing portion is in contact with the fine powder surface of the surface layer of the fine powder stored in the fine powder storage container, the powder inlet of the feed nozzle takes in the fine powder rising from the fine powder surface onto the ultrasonic vibration gushing portion through the passage region of the ultrasonic vibration gushing portion, together with the carrier gas, by ultrasonically vibrating at least part of the ultrasonic vibration gutting portion.

20 Claims, 10 Drawing Sheets

(56) References Cited

U.S. PATENT DOCUMENTS

| | | | |
|---|---|---|---|
| 2001/0033899 A1 | | 10/2001 | Noguchi et al. |
| 2005/0145651 A1 | | 7/2005 | Katefidis et al. |
| 2022/0017309 A1 | | 1/2022 | Kimura et al. |

FOREIGN PATENT DOCUMENTS

| | | | | |
|---|---|---|---|---|
| JP | H0733228 | A | | 2/1995 |
| JP | H08309177 | | * | 11/1995 |
| JP | H8-309177 | A | | 11/1996 |
| JP | 2001-18206 | A | | 1/2001 |
| JP | 2004-307147 | A | | 11/2004 |
| JP | 2006-283099 | A | | 10/2006 |
| JP | 2016-40196 | A | | 3/2016 |
| JP | 2018118848 | A | | 8/2018 |
| JP | 6612418 | B1 | | 11/2019 |
| TW | 230762 | B | | 9/1994 |
| TW | 502307 | B | | 9/2002 |
| TW | 202037547 | A | | 10/2020 |

OTHER PUBLICATIONS

International Application No. PCT/JP2022/024608, International Preliminary Report on Patentability, mailed Jan. 18, 2024.

European Search Report for 22837463.7, dated Jun. 7, 2024.

International Application No. PCT/JP2022/024608, International Search Report, mailed Sep. 13, 2022.

European Search Report for 22837461.7, dated Jun. 7, 2024.

* cited by examiner

GAS TRANSFER TYPE ULTRASONIC GUSHING FINE POWDER QUANTITATIVE FEEDING SYSTEM AND GAS TRANSFER TYPE ULTRASONIC GUSHING FINE POWDER QUANTITATIVE FEEDING METHOD

TECHNICAL FIELD

The present invention relates to a gas transfer type ultrasonic gushing fine powder quantitative feeding system, a gas transfer type ultrasonic gushing fine powder quantitative feeding method and an ultrasonic unit used in said method and system.

BACKGROUND ART

Conventionally, a device that quantitatively and stably feeds powder having a fine particle size such as metal, ceramic, or plastic has been widely used, for example, in a thermal spraying device, a spacer spraying device for a liquid crystal substrate, a powder compression molding, a sandblast device, 3D printer, laser cladding, or a powder coating device, and the like, (for example, refer to Patent Documents 1 and 2).

Patent Document 1 discloses a gas transfer type quantitative feeder for powder that can quantitatively feed a desired amount of powder in accordance with the properties of the powder by using a surface location detecting means for detecting the surface location of the powder, a level adjustment mechanism for adjusting an outlet of a feed nozzle to an appropriate position adjacent to the powder surface, and a controlling means to maintain the outlet of the feed nozzle to an appropriate position, which makes it possible to always determine the optimal device position for the outlet placed at the tip of the feed nozzle and the surface of the powder in the cassette container.

Patent Document 2 discloses a gas-conveying type quantitative feeder for powder that can feed a desired amount of powder to a thermal spray device, etc. continuously for a long period of time.

In such a gas transfer type powder quantitative feeder, first, powder is quantitatively taken from a powder storage container into a powder carrier passage, and then, the powder taken is gas-transferred up to a target position, and a mixed fluid of the gas transferred at the target position and the powder is discharged so that quantitative feeding of the powder is carried out.

PRIOR ART DOCUMENT

Patent Document

[Patent Document 1] JP H8-309177 A
[Patent Document 2] JP 2016-40196 A
[Patent Document 3] JP 6612418 B

OUTLINE OF THE INVENTION

Problems to be Solved by the Invention

Quantitative and stable introduction of powder from a powder storage container into a powder carrier passage has been achieved by the inventions according to Patent Documents 1 and 2. However, such a device makes the powder electrostatically charged due to friction with the inner wall of the carrier passage during gas transfer, and particularly in the case of fine powder particles with extremely light mass, the fine powder particles adhere to the tube inner wall by failing to counter against electrostatic attractive force with the tube inner wall which is oppositely charged. Then, the layer of adhered fine powder grows as the operation time of the device is elongated, which ultimately blocks the carrier passage, possibly leading to feed suspension of the powder.

In order to avoid such a problem, there has been conventionally used a means in which a metal or a conductive plastic that facilitates charge transfer is used as a constituting material of a carrier passage to release the static electricity into the ground. However, when such a conductive material is used, there arises a new problem that the carrier passage must be replaced frequently because the transferred powder comes into contact with the carrier passage made of the conductive material to abrade the inner wall of the carrier passage. Further, there is also known a method of electrical neutralization by blowing oppositely charged ions to the generated electrical charges; however, the effect is low because even if ions having opposite charges are fed from an inlet of a long and thin passage such as the powder carrier passage, the charge of ions disappear on the way and do not spread over the entire carrier passage because the lives of the ions are short.

On the other hand, in the field of handling powder, basically the inclusion of water in the powder is avoided as much as possible, and particularly in the field of gas transfer type powder quantitative feeding, it is common to dry not only the powder but also the carrier gas. This is because a high water content causes liquid cross-linking between the particles that are the cause of inducing adhesion in between the particles which impairs the fluidity of the powder. However, although in the case of a powder kind that is dependent of powder fluidity, i.e. powder with good fluidity, reducing the liquid cross-linking by eliminating the water content contributes to its quantitative/stable feeding, in the case of powder such as fine powder with low fluidity, there is a need of a solution for the problem induced by static electricity because an adverse effect is rather large due to static electricity generated in a dry state.

Therefore, in order to quantitatively convey and supply fine powder with a carrier gas, a method for removing static electricity that causes powder adhesion to the carrier passage and a system used for such a method have been proposed (for example, See Patent Document 3).

Here, the role of such a gas-conveying powder constant supply device is to take in a fixed amount of powder from the powder reservoir to the powder carrier passage as the first step, and to move the taken-in powder to the target position as the second step. Then, as the third step, the powder is discharged, and the process is completed.

Therefore, the present inventors overcome the incorporation of difficult-to-flow powders (mainly fine powders), for which the first step was difficult, using the conventional technology described in Patent Document 1 described above. bottom. In addition, in the second step, the powder with poor flowability is generated, causing a new problem that the carrier passage is likely to be clogged. The inventors of the present invention have overcome this problem with a conventional technique for suppressing static electricity generated in a mixed fluid by humidification described in the above-mentioned Patent Document 3.

However, even if the technology described in Patent Document 3 is applied, in fine powder thermal spraying, where the feature of fixed quantity supply of difficult-to-flow powder should be maximized, the fine powder turns into agglomerated large lumps, passes through the above first and second steps, and in the third step, the agglomerated large lumps it frequently occurs that it is released as it is, each time, it was found that mottles appeared on the thermal spray coating.

That is, even if the conventional technology described in the above-mentioned Patent Document 3, which suppresses static electricity generated in the mixed fluid by humidification, in conveying highly cohesive fine powder, generation of cohesive large lumps and non-uniformity of powder surface height resulting therefrom occur. In the process of leveling the powder surface with a scraper, flap, etc., fine powder with strong cohesion forms large cohesive lumps as the frequency of contact between powders or between the powder and the scraper increases.

When such cohesive masses are generated, it becomes impossible to level the fine powder surface with scrapers, flaps, etc., and the height of the fine powder surface becomes uneven. The result is feed nozzle aspiration of agglomerates and uneven intake due to non-uniformity in fine powder surface height. As a result, in the thermal spraying apparatus to which the powder is transferred, the unstable powder supply accompanied by large pulsation results in the formation of a thermal sprayed coating including uneven mottles.

The present invention has been made in view of the above-mentioned problems, and the present invention provides a gas transfer type ultrasonic gushing fine powder quantitative feeding method and system capable of quantitatively and stably conveying and supplying fine powder, which is particularly light in mass among powders. Apparatuses that can be used in such methods and systems are also provided.

Means for Solving the Problem

In a gas transfer type ultrasonic gushing fine powder quantitative feeding system according to an embodiment of the present invention, the gas transfer type ultrasonic gushing fine powder quantitative feeding system comprising:

- a humidification chamber configured to humidify a carrier gas; and
- a gas transfer type ultrasonic gushing fine powder quantitative feeding device configured to quantitatively supply a mixed fluid of the carrier gas and fine powder to a fine powder using device, by supplying the carrier gas from the humidification chamber,
- wherein the gas transfer type ultrasonic gushing fine powder quantitative feeding device comprises:
- a fine powder storage container configured to store the fine powder;
- a housing configured to house the fine powder storage container in a gas-tight manner;
- a feed port configured to supply the carrier gas to the housing;
- a flow rate adjustment mechanism configured to adjust supply amount of the carrier gas to the housing;
- a feed nozzle configured to have a powder inlet for taking in the fine powder and the carrier gas, to accompany the fine powder with the carrier gas from the fine powder storage container, and to supply the fine powder and the carrier gas to the fine powder using device;
- a position detection sensor configured to detect a relative position between the feed nozzle and a fine powder surface of a surface layer of the fine powder stored in the fine powder storage container;
- an ultrasonic vibration gutting portion configured to be placed at least below the powder inlet of the feed nozzle and to be capable of ultrasonic vibration, the ultrasonic vibration gutting portion having a passage region through which the fine powder can pass in the vertical direction;
- a feed nozzle driving unit configured to vertically move the feed nozzle and the ultrasonic vibration gushing portion; and
- a humidity measurement sensor configured to measure a humidity in the housing, and
- wherein, in a state in which at least part of the ultrasonic vibration gushing portion is in contact with the fine powder surface of the surface layer of the fine powder stored in the fine powder storage container, the powder inlet of the feed nozzle takes in the fine powder rising from the fine powder surface onto the ultrasonic vibration gushing portion through the passage region of the ultrasonic vibration gushing portion, together with the carrier gas, by ultrasonically vibrating at least part of the ultrasonic vibration gutting portion.

In the gas transfer type ultrasonic gushing fine powder quantitative feeding system,

- wherein, in the state that the relative positional between the fine powder surface and the ultrasonic vibration gutting portion relationship is changed in the lateral direction perpendicular to the vertical direction, the fine powder passing through the passage region from below to above the passage region in contact with the fine powder surface in the ultrasonic vibration gushing portion, so that the fine powder rises from the fine powder surface onto the ultrasonic vibration gushing portion, by ultrasonically vibrating the ultrasonic vibration gutting portion.

In the gas transfer type ultrasonic gushing fine powder quantitative feeding system, further comprising an ultrasonic vibration driver arranged in the housing and ultrasonically vibrating the ultrasonic vibration gushing portion.

In the gas transfer type ultrasonic gushing fine powder quantitative feeding system, wherein the ultrasonic vibration driver is an ultrasonic vibrator.

In the gas transfer type ultrasonic gushing fine powder quantitative feeding system, further comprising a gripping part to which the ultrasonic vibration driver, the position detection sensor, and the feed nozzle are fixed.

In the gas transfer type ultrasonic gushing fine powder quantitative feeding system, further comprising an ultrasonic vibration controller that controls the frequency and amplitude of vibration of the ultrasonic vibration gushing portion by controlling the operation of the ultrasonic vibration driver.

In the gas transfer type ultrasonic gushing fine powder quantitative feeding system,

- wherein, in a state where at least part of the ultrasonic vibration gushing portion is in contact with the fine powder surface, the ultrasonic vibration controller controls the operation of the ultrasonic vibration driver so that the frequency at which the ultrasonic vibration gushing portion vibrates is 3 kHz or higher.

The gas transfer type ultrasonic gushing fine powder quantitative feeding system, further comprising a rotary drive unit configured to drive the fine powder storage container so as to rotate in the reference rotation direction with the vertical direction as the rotation axis,

- wherein a relative positional relationship between the fine powder surface and the ultrasonic vibration gushing portion in the reference rotation direction changes, by the rotary drive unit rotating the fine powder storage container in the reference rotation direction.

In the gas transfer type ultrasonic gushing fine powder quantitative feeding system, wherein the ultrasonic vibration gutting portion includes a plate portion having a plate-like shape, wherein the plate portion is formed with a through hole penetrating vertically between the upper surface and the under surface of the plate portion as the passage region, and wherein, in a state in which the rotary drive unit rotates the fine powder storage container in the reference rotation direction, the feed nozzle driving unit vertically moves the ultrasonic vibration gushing portion so that the under surface side of the plate portion contacts the fine powder surface.

In the gas transfer type ultrasonic gushing fine powder quantitative feeding system, wherein the plate part is made of metal, ceramics, or resin having a certain or higher rigidity.

In the gas transfer type ultrasonic gushing fine powder quantitative feeding system, wherein the ultrasonic vibration gushing portion comprises a smoothing wall connected to the end of the plate part, wherein, in a state where the relative positional relationship between the fine powder surface and the ultrasonic vibration gushing portion in the reference rotation direction changes, the smoothing wall smoothes the fine powder surface of the surface layer of the fine powder, and the smoothing wall prevents the fine powder located on the surface of the fine powder from flowing from the lateral direction to the upper surface side of the plate portion.

In the gas transfer type ultrasonic gushing fine powder quantitative feeding system, wherein, in a state in which the rotary drive unit rotates the fine powder storage container in the reference rotation direction and the ultrasonic vibration gutting portion is ultrasonically vibrated, the fine powder located on the upper surface side of the plate portion is taken in from the powder inlet of the feed nozzle together with the carrier gas.

In the gas transfer type ultrasonic gushing fine powder quantitative feeding system, wherein the plate portion is connected to the ultrasonic vibration driver through the smoothing wall.

In the gas transfer type ultrasonic gushing fine powder quantitative feeding system, wherein the ultrasonic vibration gushing portion includes a pipe part having a pipe-like shape, wherein the pipe portion has an interior having the pipe-shaped shape, as the passage region, is formed to connect the upper end and the lower end of the pipe portion in the vertical direction, and wherein, in a state in which the relative positional relationship in the lateral direction between the fine powder surface and the ultrasonic vibration gushing portion is changed while the lower end of the pipe portion is in contact with the fine powder surface, the feed nozzle takes in the fine powder, rising from the upper end of the pipe portion to the upper surface of the ultrasonic vibration gushing portion through the inside of the pipe-shaped shape which is the passage region, together with the carrier gas from the powder inlet of the feed nozzle, by ultrasonically vibrating the ultrasonic vibration gutting portion.

In the gas transfer type ultrasonic gushing fine powder quantitative feeding system, wherein the ultrasonic vibration gutting portion includes a net portion having a net-like shape penetrating between the upper surface and the under surface as the passage region, and wherein, in a state in which the relative positional relationship in the lateral direction between the fine powder surface and the ultrasonic vibration gushing portion is changed while the under surface of the net portion is in contact with the fine powder surface, the feed nozzle takes in the fine powder, rising to the upper surface of the ultrasonic vibration gushing portion through the net portion which is the passage region, together with the carrier gas from the powder inlet of the feed nozzle, by ultrasonically vibrating the ultrasonic vibration gutting portion.

In the gas transfer type ultrasonic gushing fine powder quantitative feeding system, wherein the fine powder has an average particle size of 3 μm or less.

In the gas transfer type ultrasonic gushing fine powder quantitative feeding system, wherein the fine powder is powder made of spinel, titanium oxide, yttria, tungsten carbide, copper, zinc, nickel, or alumina.

In the gas transfer type ultrasonic gushing fine powder quantitative feeding system, wherein the humidification chamber comprises:

a water tank containing a liquid configured to humidify the carrier gas;

an ultrasonic vibration mechanism configured to atomize the liquid; and a humidity control mechanism configured to control the humidity in the housing in conjunction with the humidity measurement sensor.

In a device according to an embodiment of the present invention, the device comprises:

the gas transfer type ultrasonic gushing fine powder quantitative feeding system; and a thermal spraying device, which is the fine powder using device, configured to be supplied with the fine powder entrained in the carrier gas, from the feed nozzle of the gas transfer type ultrasonic gushing fine powder quantitative feeding device of the gas transfer type ultrasonic gushing fine powder quantitative feeding system, In the device, wherein the gas transfer type ultrasonic gushing fine powder quantitative feeding system supplies the fine powder to the thermal spraying device, so as to suppress the generation of pulsation in conveying the fine powder conveyed in the carrier passage from the powder inlet of the feed nozzle to the thermal spraying device, and wherein the thermal spraying equipment forms a uniform thermal spray coating on the object while suppressing the generation of mottled patterns, by using the fine powder supplied from the gas transfer type ultrasonic gushing fine powder quantitative feeding system.

In a gas transfer type ultrasonic gushing fine powder quantitative feeding method, according to an embodiment of the present invention, that uses a gas transfer type ultrasonic gushing fine powder quantitative feeding system comprising: a humidification chamber configured to humidify a carrier gas; and a gas transfer type ultrasonic gushing fine powder quantitative feeding device configured to quantitatively supply a mixed fluid of the carrier gas and fine powder to a fine powder using device, by supplying the carrier gas from the humidification chamber, wherein, in the method, the gas transfer type ultrasonic gushing fine powder quantitative feeding device comprises:

- a fine powder storage container configured to store the fine powder;
- a housing configured to house the fine powder storage container in a gas-tight manner;
- a feed port configured to supply the carrier gas to the housing;
- a flow rate adjustment mechanism configured to adjust supply amount of the carrier gas to the housing;
- a feed nozzle configured to have a powder inlet for taking in the fine powder and the carrier gas, to accompany the fine powder with the carrier gas from the fine powder storage container, and to supply the fine powder and the carrier gas to the fine powder using device;
- a position detection sensor configured to detect a relative position between the feed nozzle and a fine powder surface of a surface layer of the fine powder stored in the fine powder storage container;
- an ultrasonic vibration gutting portion configured to be placed at least below the powder inlet of the feed nozzle and to be capable of ultrasonic vibration, the ultrasonic vibration gutting portion having a passage region through which the fine powder can pass in the vertical direction;
- a feed nozzle driving unit configured to vertically move the feed nozzle and the ultrasonic vibration gushing portion; and
- a humidity measurement sensor configured to measure a humidity in the housing, and wherein, in a state in which at least part of the ultrasonic vibration gushing portion is in contact with the fine powder surface of the surface layer of the fine powder stored in the fine powder storage container, the powder inlet of the feed nozzle takes in the fine powder rising from the fine powder surface onto the ultrasonic vibration gushing portion through the passage region of the ultrasonic vibration gushing portion, together with the carrier gas, by ultrasonically vibrating at least part of the ultrasonic vibration gutting portion.

In the gas transfer type ultrasonic gushing fine powder quantitative feeding method, wherein, in the state that the relative positional between the fine powder surface and the ultrasonic vibration gutting portion relationship is changed in the lateral direction perpendicular to the vertical direction, the fine powder passing through the passage region from below to above the passage region in contact with the fine powder surface in the ultrasonic vibration gushing portion, so that the fine powder rises from the fine powder surface onto the ultrasonic vibration gushing portion, by ultrasonically vibrating the ultrasonic vibration gutting portion.

Effect of the Invention

According to the present invention, extremely light-mass fine powder can be quantitatively and stably transported to an apparatus using the fine powder.

MODE FOR CARRYING OUT THE INVENTION

Hereinafter, modes for carrying out the present invention (hereinafter referred to as embodiments) will be described in details with reference to the drawings. Note that, the present invention shall not be limited to the embodiments described below. In addition, constituting elements in the embodiments described below include those that can be easily predicted by those skilled in the art and those that are substantially the same. Further, the constituting elements disclosed in the embodiments below can be appropriately combined.

<Gas Transfer Type Fine Powder Quantitative Feeding Method>

Figure 1:
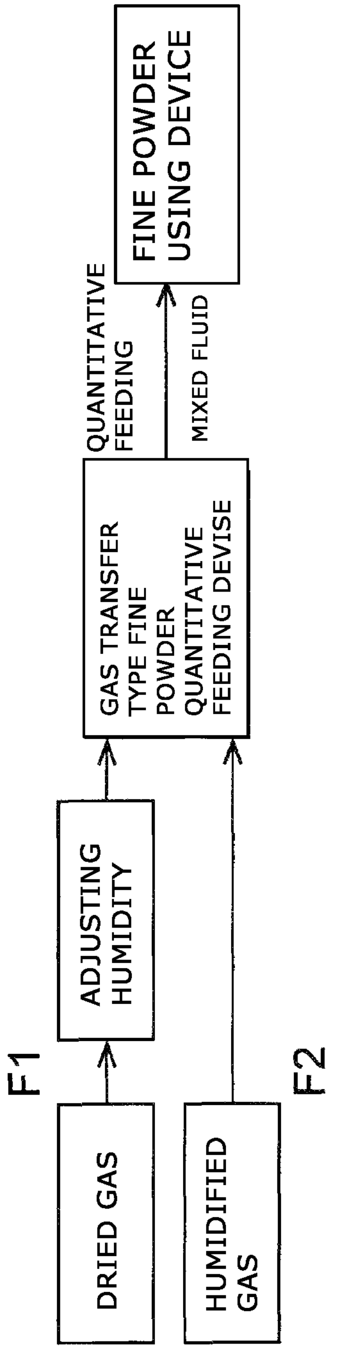
FIG. 1 is a conceptual diagram of the fine powder quantitative supply method of the present invention.

The gas transfer type ultrasonic gushing fine powder quantitative feeding method of the present invention shall be explained. FIG. 1 is a conceptual diagram of a gas transfer type ultrasonic gushing fine powder quantitative feeding method according to the present invention. The gas transfer type ultrasonic gushing fine powder quantitative feeding method of the present invention is characterized in that humidity of the carrier gas is adjusted such that static electricity in the mixed fluid of the fine powder and the carrier gas generated at the time of transferring the fine powder is reduced. As shown in Flow F1 in FIG. 1, the humidity of the carrier gas can be adjusted by, for example, mixing a high-humidity gas when the dry gas is fed from the gas feed source to the fine powder feeder. As shown in Flow F2 of FIG. 1, a carrier gas with its humidity adjusted beforehand may be prepared, and the humidity-adjusted carrier gas may be fed to the fine powder feeder as it is.

The method for adjusting humidity (humidification) of the carrier gas can be carried out by any method as long as the present invention can exert its effect. For example, the humidity of the carrier gas can be adjusted to be in a desired range by mixing a dry gas and a high-humidity gas containing liquid atomized by atomization and appropriately adjusting the mixture ratio. The atomization method of the liquid is commonly done by way of ultrasonic wave. Therefore, the gas transfer type ultrasonic gushing fine powder quantitative feeding method of the present invention may include a step of mixing the dry gas and the high-humidity gas to adjust the humidity before feeding the carrier gas to the fine powder quantitative feeder, or the carrier gas whose humidity has been adjusted in advance may be supplied to the fine powder quantitative feeder as it is.

In the present invention, fine powder refers to fine powder having an average particle size of 10 μm or less (more preferably, the average particle size is 3 μm or less), and the smaller the average particle size is, the fine powder is more likely to be affected by static electricity. Examples of the fine powder include, but are not particularly limited to, metal, plastic, and ceramic. In addition, since plastic and ceramic which are light in mass are more easily charged than metal and more likely to be affected by static electricity, there is a high demand for removal of static electricity. In the present invention, the average particle size of the fine powder can be calculated by geometric particle size measurement using an image measurement method when, for example, in the case of powder used in general thermal spraying.

Accordingly, in the case of a fine powder having an extremely small particle size and an extremely light mass, it is impossible to prevent the adsorption between the fine powders to each other or between the fine powder and other substances by reducing liquid cross-linking force or capillary force by removal of water as carried out in the conventional powder feed field. Fluidity of the powder, contributing to the easiness of the powder being transferred, has higher dependency on surface properties as the particle size gets smaller, and due to the friction generated between the powder and the transfer tube at the time of transfer, particularly in the case of inside a tube like a transfer tube, the absorption of the fine powder is more dominated by the static electricity force than by liquid cross-linking by water. Further, the means where metal or conductive plastic in which charge transfer is easy is used as the material for constituting the carrier passage to release static energy to the ground has a new problem that friction of the carrier passage is generated. Further, neutralization by oppositely charged ions is less effective in the powder carrier passage having a very long and narrow form because the ions do not sufficiently spread inside the tube.

Figure 2:
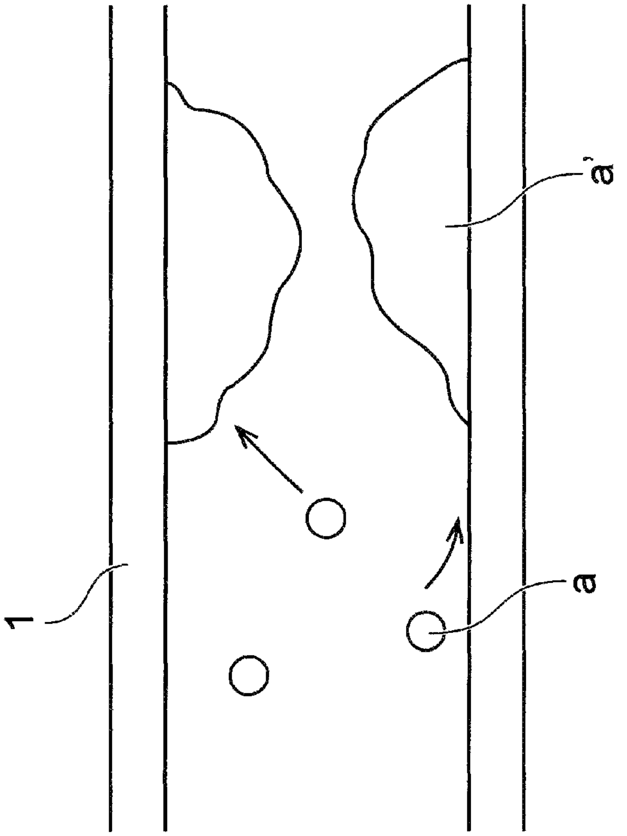
FIG. 2 is a conceptual diagram of fine powder deposition in a tube for powder transportation.

Here, static electricity is a physical phenomenon caused by electric charges which are static, and it is considered that the static electricity is generated when fine powder moving at a speed equal to or higher than a certain level comes into contact with the inner wall of the transferring tube during gas transfer of the fine powder in the case of feeding the fine powder. As shown in FIG. 2, when static electricity is generated in the mixed fluid during transfer of the fine powder, fine powder a having an extremely light mass is drawn and attached to transferring tube 1, and is deposited on the inner wall of the tube 1. Then the deposited fine powder a' further deposits by drawing fine powder a that is transferred afterwards, and eventually the transferring tube 1 gets blocked, making it impossible to feed the fine powder a. Therefore, suppressing static electricity in the mixed fluid of the fine powder a and the transferring gas is important in quantitative and stable feeding of the fine powder.

On the other hand, when the humidity of the carrier gas is too high or when the fine powder itself is humidified, the fine powder could adhere to the inside of the carrier passage due to dew condensation, making it impossible being fed, or its melting could be incomplete in the subsequent thermal spraying.

Therefore, in the present invention, the static electricity generated in the transportation and supply process is reduced by adjusting the humidity within a predetermined humidity range, as described in the above-mentioned Patent Document 3, as a premise of the basic configuration.

<Scattering Time T>

As an indicator of the magnitude of the influence of static electricity on powder transfer, evaluation can be carried out by using scattering time T. T is a parameter indicating the time from generation to elimination (scattering) of the static electricity. For example, it is known that the higher the absolute humidity is, the static electricity is less likely to be charged, and thus T becomes smaller, and that there is an extremely high correlation between the fact that static electricity is uneasily accumulated and humidity. It is also known that the lower the temperature is, the smaller T becomes in the same absolute humidity. Therefore, it can be said that the time until the static electricity eliminates can be shortened by lowering the temperature while maintaining the absolute humidity high.

In the present invention, the scattering time T refers to a value measured by the following method. That is, a certain amount of charged fine powder (e.g. alumina powder) is stored in a faraday cup and placed in a humidifying chamber kept in a predetermined humidity. Then, immediately after placing the faraday cup storing the fine powder in the humidifying chamber, charged amount of the fine powder is measured by using a measuring instrument such as an electrostatic capacity meter to record a charged amount change curve, and the time until the charged amount of the fine powder decreases to 37.8% of the initial value at t=0 is read, and such time is defined as T.

There is a correlation that is uniquely determined between the absolute humidity and T, and if a numerical value of either one can be found out, it is possible to determine the other one in the case of static electricity generated in a specific substance. Specifically, the following relation is satisfied in between scattering time τ (second), electric resistance R (Ω) of a substance in which static electricity is generated, and static capacity C (F).

$$\tau = R \times C$$

Here, C is a value that can be measured by a static capacity meter such as an LCR meter, and since it is known that the electric resistance R has an exponential relationship with the absolute humidity, if either one of the absolute humidity and the scattering time T can be found out, it is possible to calculate the other one.

It is noted that, scattering time T is 0 to 10 seconds, preferably 0 to 8 seconds, more preferably 0 to 5 seconds. When T is in such a range, the influence of static electricity generated in the tube on powder blockage is small, and the fine powder can be transferred and fed quantitatively and stably.

Determining such a correlation between τ and humidity in advance makes it possible to maintain the scattering time τ within a predetermined range by adjusting the humidity.

Therefore, either the value of the scattering time τ or humidity is enough to be found out when the present invention is carried out.

Here, as described above, even if the technique of suppressing static electricity generated in the mixed fluid by humidification (for example, see Patent Document 3 described above) is used, in conveying highly cohesive fine powder, generation of cohesive large lumps and non-uniformity of powder surface height resulting therefrom occur. In the process of leveling the powder surface with a scraper, flap, or the like, fine powder with strong cohesion may form cohesive large lumps as the frequency of contact between powders or between the powder and the scraper increases.

Figure 3:
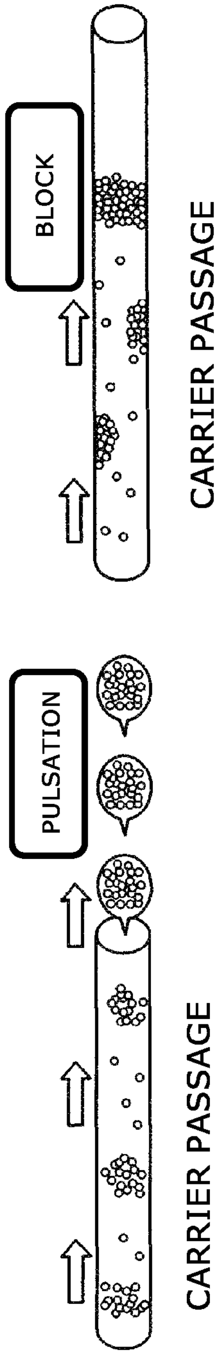
FIG. 3 is a diagram showing the concept of pulsation generated in the carrier passage by fine powder that aggregates during powder conveyance.

When such a cohesive mass is generated, it becomes impossible to level the powder surface with scrapers, flaps, etc., and the height of the powder surface becomes uneven. As a result, inconsistency in the captured amount occurs, caused by feed nozzle suction of agglomerates and non-uniformity of powder surface height. As a result, for example, as shown in FIG. 3, at the destination thermal spraying equipment, unstable powder supply accompanied by large pulsations in the carrier passage results in the formation of thermal spray coatings with uneven mottles.

Then, for example, when powder is crushed or pulverized dry, rotor mills, bead mills, jet mills, etc. are used.

Figure 4:
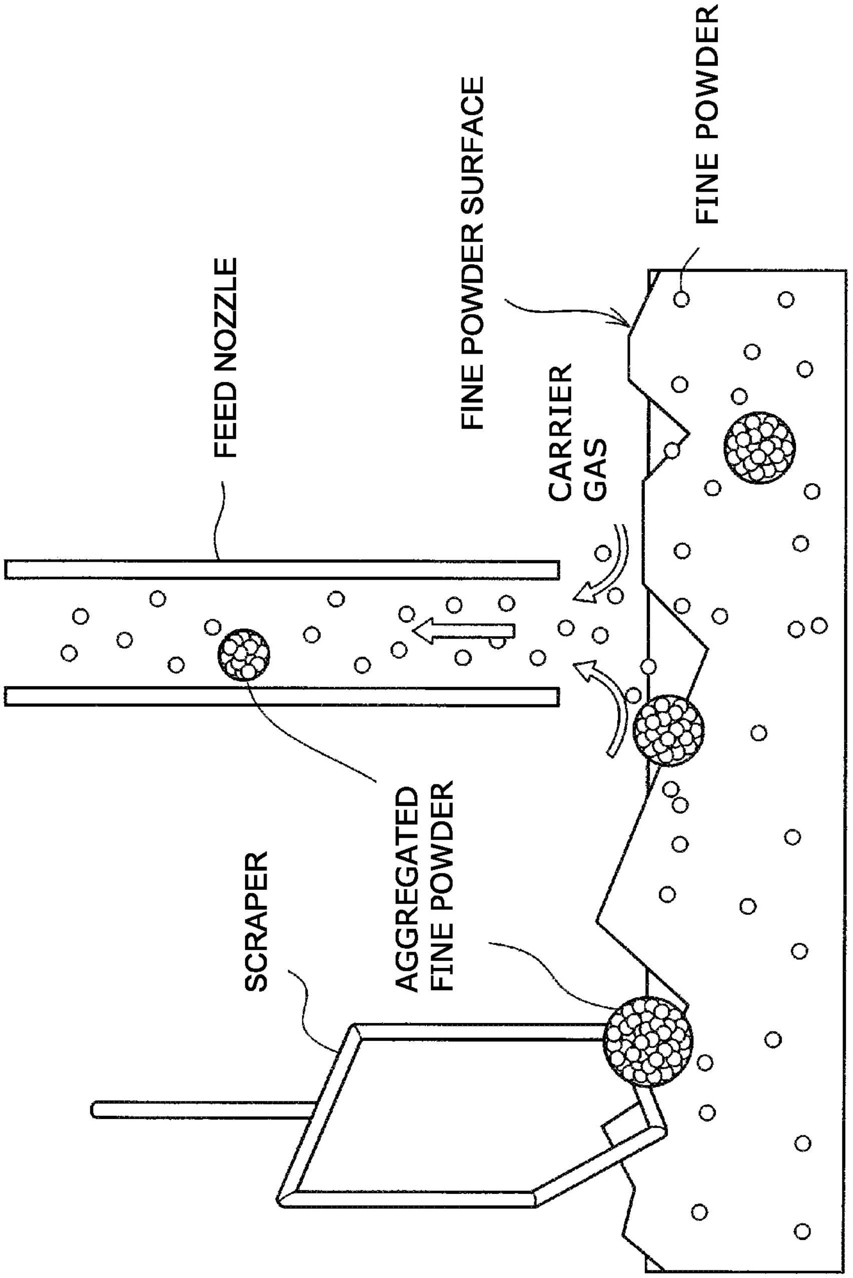
FIG. 4 is a diagram showing an example of conveying fine powder from the surface of fine powder into a feed nozzle together with a carrier gas in a conventional fine powder feeding device.

However, when crushing or pulverizing powder with a small particle size and strong agglomeration, agglomerated powder is generated even during pulverization, and powder adheres to the inside of the device and the discharge path, which often makes continuous operation of the device difficult (FIG. 4).

Therefore, the present inventors devised crushing by ultrasonic vibration as a new crushing method. In general, when a highly cohesive powder is vibrated, the particles come into contact with each other and collide with each other to start forming an agglomerated powder. Furthermore, when the generated aggregated powder is continuously subjected to vibration, the size of the aggregated powder increases and the aggregated powder grows into a large lump. On the other hand, it was found from the verification test that the agglomerated large lumps were disintegrated when vibrations with a frequency of 3 kHz or more were applied.

Furthermore, for example, when a scraper is used to level powder having a strong cohesive property, the powder naturally adheres to the scraper when it comes into contact with the scraper. However, when ultrasonic vibration is applied to the scraper, the powder becomes difficult to adhere due to the effect of reducing friction. By utilizing this effect, the powder can be made to rise up from a small hole made in the metal plate (plate-shaped rigid body) that smoothes the powder surface.

Normally, even if a plate with small holes drilled in the plate surface is leveled horizontally along the surface of highly cohesive powder, it cannot be expected that a constant amount of powder will continuously rise from the hole. The reason for this is that the aggregates are large and do not pass through the holes, and the frictional resistance when passing through the holes is very large.

However, as described later, in the present invention, when the plate-shaped plate part that constitutes the ultrasonic vibration gutting portion is ultrasonically vibrated, by crushing agglomerates and reducing friction, the fluidity of the fine powder in the vicinity of the plate portion increases, and the fine powder flows out from the through holes of the passage region formed in the plate portion to the upper surface side of the plate portion. The amount of fine powder flowing out from the through-holes varies depending on the settings (conditions) such as the size of the through hole of the plate portion, the shape of the plate portion, the speed of moving the plate portion, the material of the plate portion, and the frequency and amplitude of vibration of the plate portion. In other words, by strictly controlling these settings (conditions), the pulverized fine powder is taken in from the powder suction port of the feed nozzle, and the fine powder supply amount of the gas transfer type ultrasonic gushing fine powder quantitative feeding device 10 becomes quantitative.

By using this phenomenon in the gas-conveying fine powder supply device, this solves the problem of unstable powder supply accompanied by large pulsations that occur in the thermal spraying equipment, which has been a problem in the past. Therefore, the generation of mottling is suppressed, and a uniform thermal spray coating can be obtained.

Thus, the present invention provides a gas transfer type ultrasonic gushing fine powder quantitative feeding system, a gas transfer type ultrasonic gushing fine powder quantitative feeding method, and an apparatus, which are possible to break up agglomerated large lumps by ultrasonic vibration, smooth the powder surface height, and supply fine powder stably without large pulsations.

In addition, in the present embodiment, the fine powder is, for example, ceramic powder or alumina powder. However, the fine powder may be inorganic or organic powders other than alumina and ceramics, as described above. More specifically, the fine powder may be powder made of spinel, titanium oxide, yttria, tungsten carbide, copper, zinc, or nickel.

And, as already mentioned, the average particle size of the fine powder is, for example, 10 μm or less. However, the gas transfer type ultrasonic gushing fine powder quantitative feeding system according to the present invention is applied especially when the fine powder has an average particle size of 3 μm or less where cohesiveness increases. Thereby, it is possible to crush the aggregated fine powder, smooth the powder surface, and take in the fine powder with high accuracy.

An embodiment of the present invention will be described below with reference to specific examples shown in the drawings. In addition, in the drawings attached to this specification, for the convenience of illustration and ease of understanding, the scale and the ratio of vertical and horizontal dimensions are appropriately changed and exaggerated from those of the real thing. In addition, terms used herein to specify shapes and geometric conditions and their degrees, such as "parallel", "perpendicular", "identical", length and angle values, etc, without being bound by a strict meaning, it is interpreted to include the extent to which similar functions can be expected.

<Fine Powder Quantitative Feeder>

The gas transfer type ultrasonic gushing fine powder quantitative feeding method according to the present invention can be carried out by using any fine powder quantitative feeder as long as the effect of the present invention can be exerted. In order to quantitatively and stably transfer and feed fine powder having an average particle size of 10 μm or less (especially 3 μm or less) as in the present invention, it is preferable to use, without particular limitation, a so-called surface-profiling type powder quantitative feeder as disclosed in, for example, Patent document 3 mentioned above, among conventional powder transfer devices.

Figure 5:
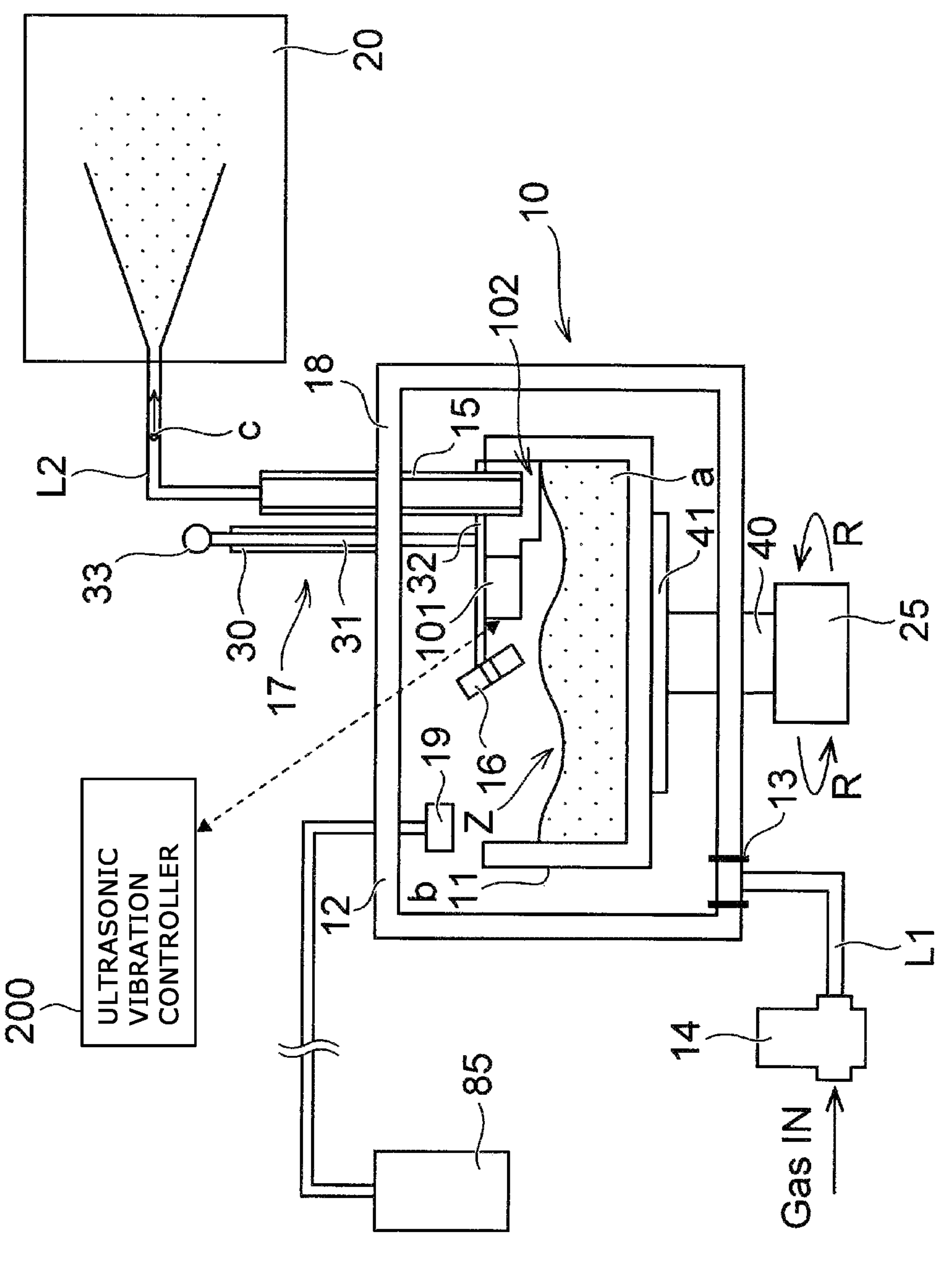
FIG. 5 is a diagram showing a fine powder feeder according to one embodiment of the present invention.
Figure 6:
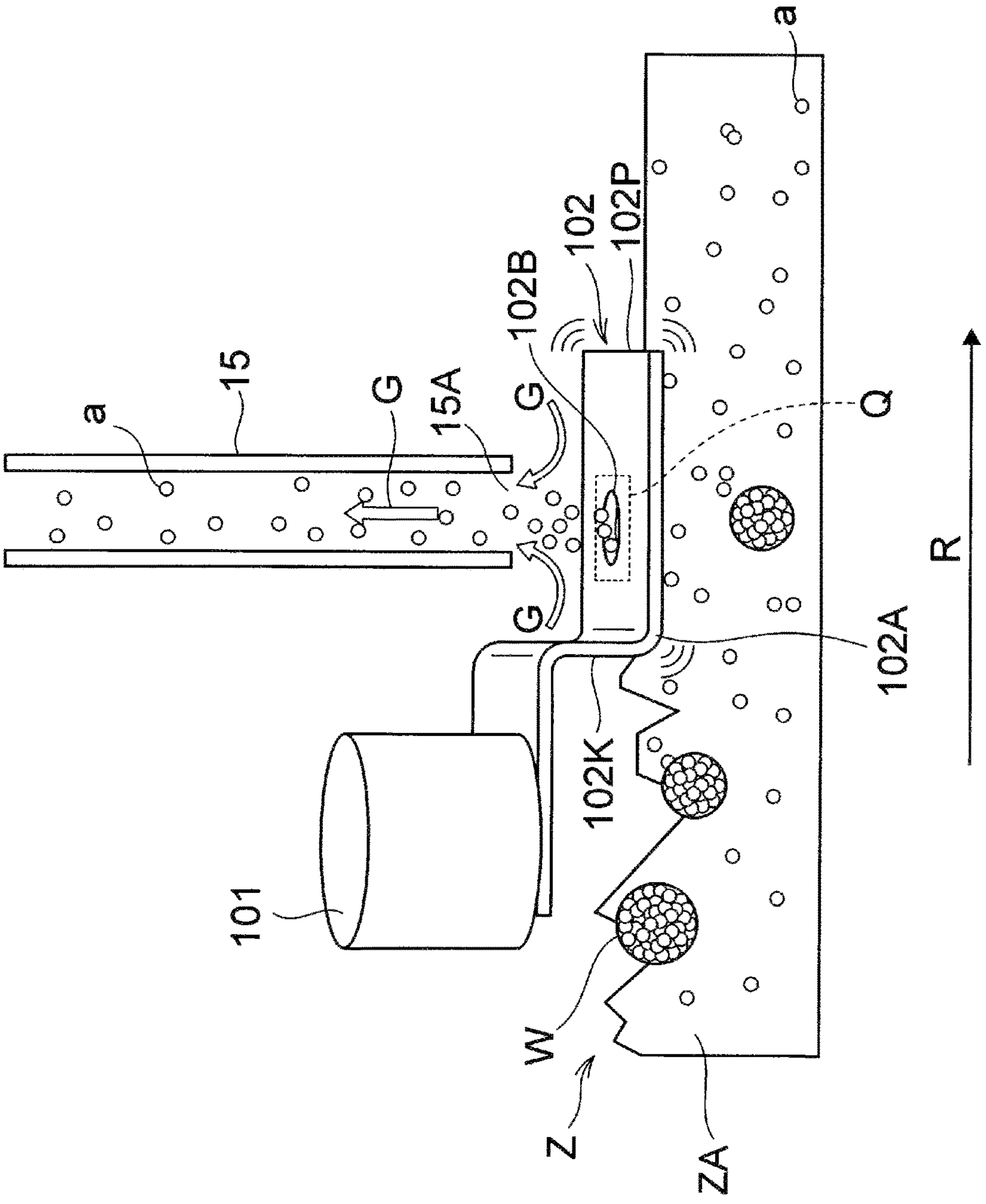
FIG. 6 is a diagram showing a portion of the ultrasonic vibration gushing portion and feed nozzle according to one embodiment of the present invention.
Figure 7:
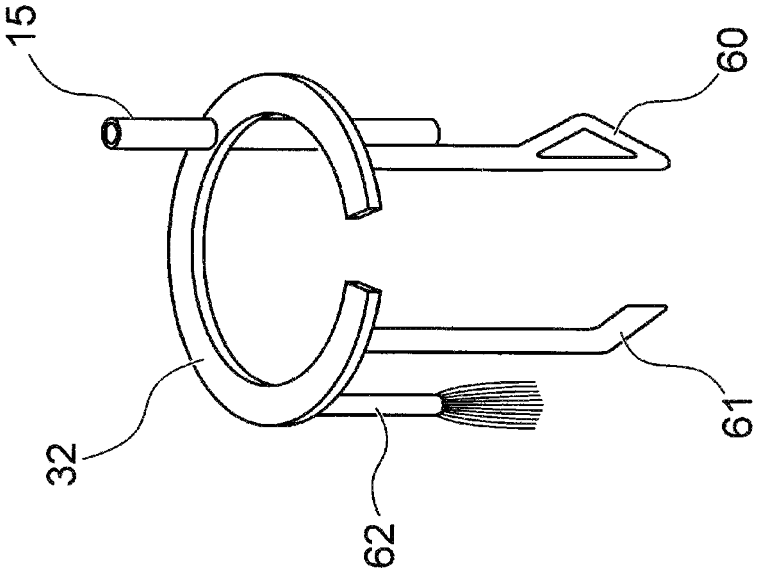
FIG. 7 is a diagram showing a configuration of a grip portion attached near the tip of a rod according to an embodiment of the present invention.

Here, FIG. 5 is a diagram showing a fine powder feeder according to one embodiment of the present invention. FIG. 6 is a diagram showing a portion of the ultrasonic vibration gushing portion and feed nozzle according to one embodiment of the present invention. FIG. 7 is a diagram showing a configuration of a grip portion attached near the tip of a rod according to an embodiment of the present invention.

For example, as shown in FIG. 5, a gas transfer type ultrasonic gushing fine powder quantitative feeding device 10 includes a fine powder storage container (a circular cup) 11, a housing 12, a supply port 13, a first flow rate adjustment mechanism 14, a feed nozzle 15, a position detection sensor 16, a position control mechanism 17, a humidity measurement sensor 19, a rotary drive unit 25, a rotary shaft 40, a rotary seat 41, an ultrasonic vibration driver 101, an ultrasonic vibration gushing portion 102, and an ultrasonic vibration controller 200.

The housing 12 includes the fine powder storage container 11 inside. The housing 12 is formed into, for example, a cylindrical shape. The housing 12 has a gas-tight structure and comprises a casing space b inside between the fine powder storage container 11. In addition, a humidity sensor 19 for monitoring the humidity of the casing space b may be provided, and the amount of the humidified carrier gas supplied from the feed port 13 to the housing 12 through the carrier gas feed path L1 may be adjusted by the first flow rate adjustment mechanism 14 in conjunction with the humidity sensor 19. By adjusting the feed amount of the humidified carrier gas in conjunction with the humidity sensor, it is possible to maintain the humidity inside the casing space b within the prescribed range. Further, an exhaust valve (not illustrated) may be provided so that the gas is exhausted when the pressure becomes equal to or higher than a predetermined pressure, in case when the pressure of the casing space b becomes excessively high.

The fine powder storage container 11 stores the fine powder a. The fine powder a may be filled in the fine powder storage container 11 before the start of the operation of the device, or may be filled by a feed nozzle (not illustrated) or the like, for example, while the device is being operated. The fine powder a is preferably filled in the fine powder storage container 11 beforehand so that the fine powder 11 can be fed outside from the start of operation of the device.

The fine powder a stored in the fine powder storage container 11 is taken in with the carrier gas by the feed nozzle 15, passes through the fine powder feed path L2 as a mixed fluid c of the fine powder a and the carrier gas, and is supplied to the fine powder using device such as a thermal spraying device 20. Accordingly, the fine powder a can be prevented from blocking by the static electricity in the fine powder feed path (the carrier passage) L2 by adjusting the humidity of the carrier gas within the predetermined range when the fine powder a is supplied to the fine powder using device by a carrier gas.

The feed nozzle 15 has a powder inlet 15A for taking in the fine powder a and the carrier gas G, and discharges the fine powder a in the fine powder storage container 11 entrained by the humidity-adjusted carrier gas fed from the feed port 13.

The carrier gas fed into the fine powder storage container 11 flows into the feed nozzle 15 while taking in the fine powder a in the fine powder storage container 11. The mixed fluid c flowing out from the feed nozzle 15 passes through the fine powder feed path L2 and is supplied to the fine powder using device such as the thermal spraying device 20.

It is preferable that the feed speed of the mixed fluid c supplied from the gas transfer type ultrasonic gushing fine powder quantitative feeding device 10 to the thermal spray device 20 is appropriately adjusted according to the purpose of use and the characteristics, for example, the specific gravity and the bulk density of the fine powder.

For example, as shown in FIG. 6, when entraining the fine powder a in the fine powder storage container 11 with the carrier gas, a powder suction port (outflow port) 15A provided at the tip of the feed nozzle 15 is arranged on a plate-like plate portion 102P that constitutes the ultrasonic vibration gutting portion 102, particularly in the vicinity of the passage region Q. As a result, the fine powder a on the plate portion 102P in the vicinity of the tip of the feed nozzle 15 is taken in at the same time by the suction action of the carrier gas flowing through the feed nozzle 15, and is discharged together with the carrier gas. The amount of fine powder a conveyed depends on the penetration depth of the fine powder a from the surface of the tip and the invasion speed of the fine powder a (the moving speed of the fine powder a) into the powder inlet (outlet) 15A at the tip of the nozzle. Note that, the invasion speed of the fine powder a into the outlet 15A of the tip of the feed nozzle 15 depends on the rotation speed of the fine powder storage container 11.

Here, as described above, when the plate-shaped plate portion 102P that constitutes the ultrasonic vibration gutting portion 102 is ultrasonically vibrated, the fluidity of the fine powder in the vicinity of the plate portion 102P increases due to the crushing of the aggregated large lumps and the effect of reducing friction, then fine powder flows out from the through hole 102B to the upper surface side of the plate portion 102P. The amount of fine powder a flowing out from the through-hole 102B changes depending on the settings (conditions) such as the size of the through hole 102B of the plate portion 102P, the shape of the plate portion 102P, the speed at which the plate portion 102P is moved, the material of the plate portion 102P, the frequency and amplitude for vibrating the plate portion 102P, etc. In other words, by strictly controlling these settings (conditions), the crushed fine powder a is taken in from the powder intake port 15A of the feed nozzle 15, and the gas transfer type ultrasonic gushing fine powder quantitative feeding device 10 The supply amount of fine powder a becomes quantitative.

The feed nozzle 15 is inserted inside of the housing 12 from lid 18. The feed nozzle 15 is configured to be movable in the up and down direction in the housing 12 by the position control mechanism 17.

The position control mechanism 17 is provided on a lid 18 at an upper portion of the housing 12, and can move the feed nozzle 15 in the up and down direction. As for the position control mechanism 17, it is possible to use an electrical cylinder without particular limitation.

The position control mechanism 17 includes a cylinder body 30 that moves the feed nozzle 15 up and down, a rod 31 that is movable in the up and down direction in the cylinder body 30, a gripping portion 32 that is coupled to the rod 31 and grips the feed nozzle 15, and a feed nozzle driving unit (a drive mechanism) 33.

The position control mechanism 17 can adjust the height of the feed nozzle 15 held by the gripping portion 32 by adjusting the height of the rod 31. The feed nozzle 15 moves the gripping portion of the cylinder body 30 via the rod 31 in the up and down direction to adjust the position of the tip of the feed nozzle 15. That is, the feed nozzle driving unit 33 is configured to vertically move the feed nozzle 15 and the ultrasonic vibration gutting portion 102.

This makes it possible to adjust the position (the height) of the outlet 15A positioned at the tip of the feed nozzle 15 and the ultrasonic vibration gushing portion 102 to an appropriate position at the vicinity of the fine powder a surface.

For example, when the fine powder a in the fine powder storage container 11 is to be fed to the fine powder feed path L2, the position control mechanism 17 makes the tip of the feed nozzle 15 and the ultrasonic vibration gushing portion 102 to fall towards the surface of the fine powder a.

On the other hand, when stopping the feeding of the fine powder a in the fine powder storage container 11 to the fine powder feed path L2, the feed nozzle 15 and the ultrasonic vibration gushing portion 102 are elevated so that the tip of the feed nozzle 15 and the under surface side of the ultrasonic vibration gushing portion 102 do not come into contact with the fine powder a.

The rotary drive unit 25 rotates the fine powder storage container 11 in a horizontal direction with respect to the axial direction. The fine powder storage container 11 is placed on a rotating seat 41 having a rotation axis 40 at the center of the bottom of the fine powder storage container 11, and by driving the motor 25, the rotation axis rotates, which makes the fine powder storage container 11 rotates. The rotary drive unit 25 can rotate the rotation axis 40 at a speed corresponding to the feed amount of the mixed fluid c. By rotating the fine powder storage container 11, the ultrasonic vibration gushing portion 102 that vibrates ultrasonically smooths the fine powder surface Z, and the disappearance of the fine powder a (that is, there is no fine powder a flowing out from the through hole 102B near the powder inlet 15A of the feed nozzle 15) is suppressed in the vicinity of the ultrasonic vibration gushing portion 102 that vibrates ultrasonically, so that the fine powder a can be taken in stably.

In particular, the rotary drive unit 25 drives the fine powder storage container 11 so as to rotate in the reference rotation direction R (For example, the rotation speed of this rotation is 400 rpm) with the vertical direction as the rotation axis inside the housing 12. This rotary drive unit 25 is, for example, an electric motor.

By this rotary drive unit 25 rotating the fine powder storage container 11 in the reference rotation direction R, the relative positional relationship between the fine powder surface Z and the ultrasonic vibration gushing portion 102 changes in the reference rotational direction R (lateral direction).

The position detection sensor 16 is fixed to the feed nozzle 15 while maintaining a predetermined height with respect to the tip of the feed nozzle 15 (powder intake port 15A) and/or the ultrasonic vibration gutting portion 102, and the position detection sensor 16 is for measuring the distance to the surface of the fine powder a using the position of the tip of the feed nozzle 15 and/or the position of the under surface of the ultrasonic vibration gushing portion 102 as a measurement standard. That is, the position detection sensor 16 detects the relative positions of the fine powder feed nozzle 15 and the fine powder surface Z of the surface layer ZA of the fine powder a stored in the fine powder storage container 11.

This position detection sensor 16 detects the fine powder surface position of the powder intake port 15A at the tip of the feed nozzle 15 and/or the fine powder surface position in front of the ultrasonic vibration gushing portion 102, on the trajectory of relative motion drawn with respect to the rotation of the fine powder storage container 11.

As a result, the height between the surface position of the fine powder a sucked from the powder suction port 15A and the powder suction port 15A can be measured in advance, and/or the height between the surface position of the fine powder a with which the under surface side of the ultrasonic vibration gushing portion 102 contacts and the powder inlet 15A can be measured in advance. Based on the measurement results of the position detection sensor 16, the height of the feed nozzle 15 and/or the height of the ultrasonic vibration gushing portion 102 are adjusted accordingly.

Also, the ultrasonic vibration gutting portion 102 is arranged at least below the powder intake port 15A of the feed nozzle 15, for example, as shown in FIG. 6, and is capable of ultrasonic vibration, and the ultrasonic vibration gushing portion 102 has a passage region Q through which the fine powder a can pass vertically.

Then, for example, as shown in FIG. 6, this ultrasonic vibration gutting portion 102 includes a plate portion 102P having a plate-like shape, and a smoothing wall 102K.

Furthermore, the plate portion 102P is formed with a through-hole (for example, the cross-sectional diameter of the through-hole in the lateral direction is about 2 mm) as a passage region Q that vertically penetrates between the upper surface and the under surface of the plate portion 102P.

The plate portion 102P is made of, for example, alumina, PEEK, metal having a certain rigidity or higher, ceramics, resin, or the like. In particular, for example, the plate portion 102P is a metal plate such as a copper plate or a stainless steel plate.

In particular, with the rotary drive unit 25 rotating the fine powder storage container 11 in the reference rotation direction R, the feed nozzle driving unit 33 moves the ultrasonic vibration gutting portion 102 vertically so that the under surface side of the plate portion 102P contacts the fine powder surface Z.

Also, for example, as shown in FIG. 6, the smoothing wall 102K is connected along the edge 102A of the plate portion 102P and extends vertically. Then, as shown in FIG. 6, the plate portion 102P is connected to the ultrasonic vibration driver 101 through a smoothing wall 102K.

Here, in a state where the relative positional relationship between the fine powder surface Z and the ultrasonic vibration gutting portion 102 in the reference rotation direction R changes, the smoothing wall 102K smoothes the fine powder surface Z of the surface layer ZA of the fine powder a, and the smoothing wall 102K suppresses (blocks) the fine powder a located on the fine powder surface Z from flowing from the lateral direction (Reference rotation direction R) to the upper surface side of the plate portion 102P.

Furthermore, the ultrasonic vibration driver 101 is arranged in the housing 12, for example, as shown in FIG. 5, and ultrasonically vibrates an ultrasonic vibration gutting portion 102. This ultrasonic vibration driver 101 is, for example, an ultrasonic transducer.

For example, as shown in FIG. 5, the ultrasonic vibration driver 101 (the ultrasonic vibration gutting portion 102), the position detection sensor 16, and the feed nozzle 15 are fixed to the grip portion 32.

(Ultrasonic Vibration Controller)

Also, for example, as shown in FIG. 5, the ultrasonic vibration controller 200 is adapted to control the frequency and amplitude at which the ultrasonic vibration gushing portion 102 vibrates, by controlling the operation of the ultrasonic vibration driver 101.

In particular, the ultrasonic vibration controller 200 controls the operation of the ultrasonic vibration driver 101, so that the frequency at which the ultrasonic vibration gutting portion vibrates is 3 kHz or more, in a state where at least part of the ultrasonic vibration gutting portion 102 is in contact with the fine powder surface Z.

Here, for example, as shown in FIGS. 5 and 6, the gas transfer type ultrasonic gushing fine powder quantitative feeding device 10 takes in the (crushed) fine powder a, that rises above the ultrasonic vibration gutting portion 102 (for example, the plate portion 102P) from the fine powder surface Z through the passing area Q of the ultrasonic vibration gutting portion 102, together with the carrier gas G from the powder inlet 15A of the feed nozzle 15, by ultrasonically vibrating at least a part of the ultrasonic vibration gushing portion 102 in contact with the fine powder surface Z of the surface layer ZA of the fine powder a stored in the fine powder storage container 11.

In more detail, as shown in FIG. 6, in a state that the gas transfer type ultrasonic gushing fine powder quantitative feeding device 10 changes the relative positional relationship between the fine powder surface Z and the ultrasonic vibration gushing portion 102 in the lateral direction (reference rotation direction R) perpendicular to the vertical direction, the fine powder a is caused to rise from the fine powder surface Z onto the ultrasonic vibration gushing portion 102 (plate portion 102P), as the fine powder a passes through the passage region from below to above the passage region Q in contact with the fine powder surface Z in the ultrasonic vibration gushing portion 102, by ultrasonically vibrating the ultrasonic vibration gushing portion 102.

Especially, as described above, in a state where the relative positional relationship between the fine powder surface Z and the ultrasonic vibration gushing portion 102 in the reference rotation direction R changes due to the rotary drive unit 25, the smoothing wall 102K smoothes the fine powder surface Z of the surface layer ZA of the fine powder a, and furthermore the smoothing wall 102K suppresses (blocks) the fine powder a located on the fine powder surface Z from flowing into the upper surface side of the plate portion 102P from the lateral direction (reference rotation direction R).

Then, in a state in which the rotary drive unit 25 rotates the fine powder storage container 11 in the reference rotation direction R and the ultrasonic vibration gushing portion 102 is ultrasonically vibrated, the fine powder a located on the upper surface side of the plate portion 102P is taken in from the powder suction port 15A of the feed nozzle 15 together with the carrier gas G.

This makes it possible to crush large agglomerates by ultrasonic vibration, smooth the powder surface height, and supply fine powder stably without large pulsations.

In addition, as shown in FIG. 7, a scraper 60, a flap 61, a brush 62, and the like may be fixed to and suspended from the gripping portion 32. By making the scraper 60, the flap 61, and the brush 62 fix to and suspend from the gripping portion 32, the surface of the fine powder a in the fine particle storage container 11 is evened, thereby making the surface smooth. This makes it possible to stabilize the amount of the fine powder a taken in from the feed nozzle 15 because the difference in the surface height of the fine powder a can be reduced. In addition, since the surface becomes smooth, the difference in the surface height of the fine powder a can be measured more accurately. It is not necessary to provide all of the scraper 60, the flap 61, and the brush 62 in the gripping portion 32, and one or more of these may be provided.

By using the fine powder supply device 10 having the above configuration, by crushing the aggregated fine powder and taking it into the feed nozzle while suppressing the static electricity generated when the mixed fluid c of the fine powder a and the carrier gas is conveyed, the fine powder can be quantitatively and stably transported to the fine powder application device.

<Gas Transfer Type Ultrasonic Gushing Fine Powder Quantitative Feeding System>

Figure 8:
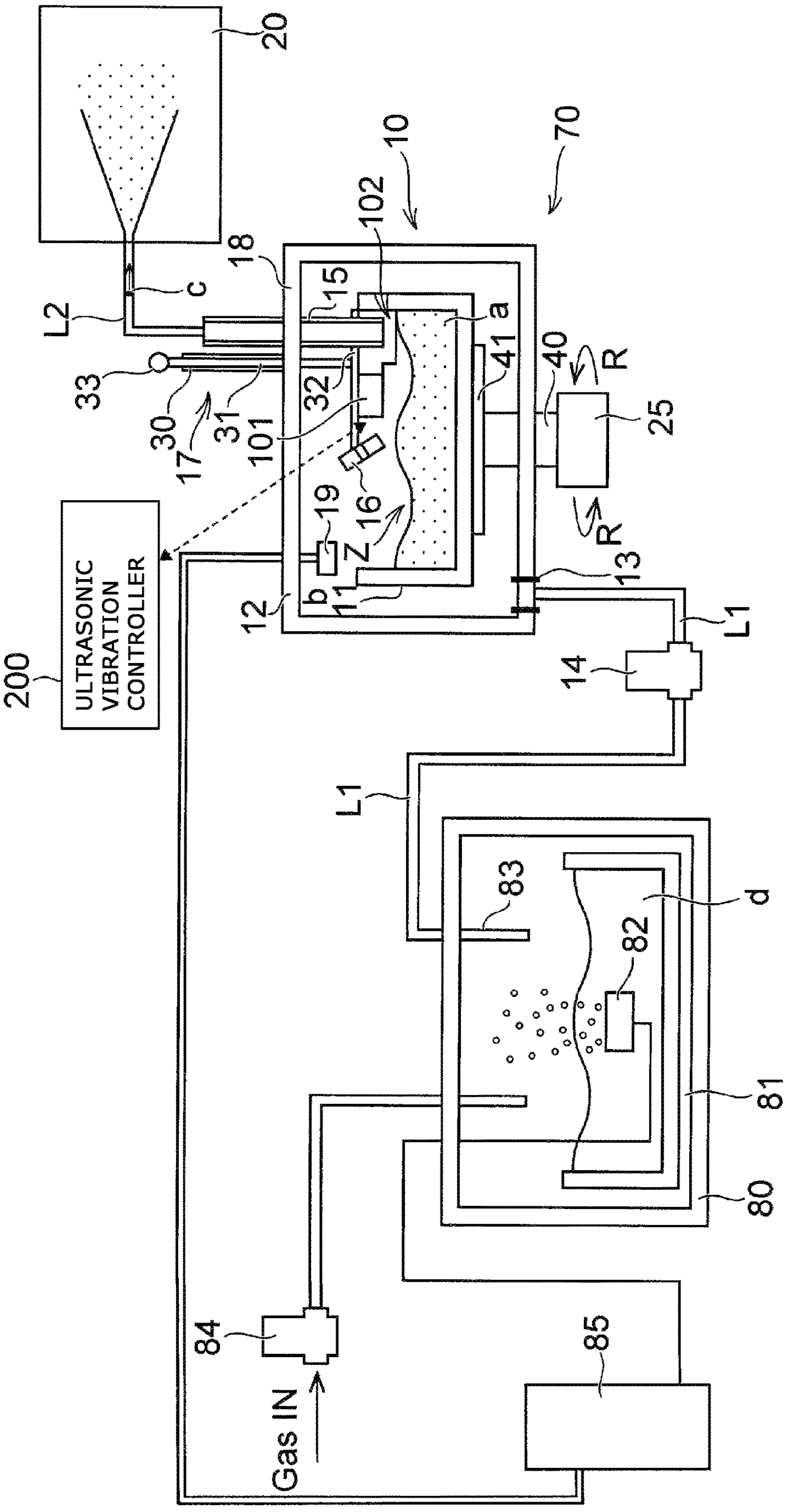
FIG. 8 is a diagram showing a fine powder supply system according to one embodiment of the present invention.

Here, the gas transfer type ultrasonic gushing fine powder quantitative feeding system according to the present invention will be explained. FIG. 8 is a schematic diagram of an apparatus (fine powder feeding system) including a gas transfer type ultrasonic gushing fine powder quantitative feeding system 70 according to the present invention, this system can be used to implement the fine powder metering method as described above.

A gas transfer type ultrasonic gushing fine powder quantitative feeding system 70 according to the present invention comprises a humidification chamber 80 for humidifying the carrier gas; and a gas transfer type ultrasonic gushing fine powder quantitative feeding device 10 that quantitatively supplies the mixed fluid c of the carrier gas and the fine powder a to a device using fine powder such as a thermal spraying device 20, by supplying a humidified carrier gas from the humidification chamber 80.

As the gas transfer type ultrasonic gushing fine powder quantitative feeding device 10, it is preferable to use a device that includes fine powder storage container 11, a housing 12, a feed port 13, a first flow rate adjustment mechanism 14, a feed nozzle 15, a position detection sensor 16, a position adjustment mechanism 17, a humidity measurement sensor 19, a rotary drive unit 25, a rotary shaft 40, a rotary seat 41, an ultrasonic vibration driver 101, an ultrasonic vibration gutting portion 102, and an ultrasonic vibration controller 200, as described above. However, it is not limited to such a device, and any gas transfer type ultrasonic gushing fine powder quantitative feeding device may be used as long as the effect of the present invention can be exhibited.

The humidifying chamber 80 includes a water tank 81 for storing liquid d for humidifying the carrier gas, an ultrasonic vibration mechanism 82 for atomizing the liquid d, a humidified carrier gas feed nozzle 83 for feeding the humidified carrier gas to the device via the carrier gas feed path L1, and a humidity control mechanism 85 for controlling the humidity in the housing 12 in conjunction with the moisture measuring sensor 19 in the housing 12 of the gas transfer type ultrasonic gushing fine powder quantitative feeding device 10.

The humidifying chamber 80 is, for example, formed in a cylindrical shape in a gas-tight manner. Water tank 81 is, for example, formed in a cylindrical shape, and the top is opened.

The water tank 81 is provided with liquid d for humidifying the carrier gas and an atomizing ultrasonic vibration mechanism 82 for atomizing the liquid d. The liquid d for humidifying the carrier gas is preferably water; however, liquid other than water may be used if desired.

Also, water is atomized by the ultrasonic vibration mechanism 82 in the present embodiment, however, if the carrier gas can be humidified, water may be evaporated by heating.

The ultrasonic vibration mechanism 82 is formed of a voltage element and a high-frequency power source and is for conducting ultrasonic vibration by applying high-frequency electric field to piezoelectric elements, and is capable of atomizing the liquid d such as water by the vibration energy of the vibration mechanism 82.

The atomized liquid d such as water can be humidified to a desired humidity range by being mixed with the dry carrier gas in the humidifying chamber 80.

The humidity measuring sensor 19 monitors the humidity of the casing space b in the housing 12 of the gas transfer type ultrasonic gushing fine powder quantitative feeding device 10.

For the sake of maintaining the humidity in the casing space b within a predetermined range, the humidity measuring sensor 19 can adjust the humidity of the carrier gas to be fed to the gas transfer type ultrasonic gushing fine powder quantitative feeding device 10 with the humidity control mechanism 85 based on the humidity measurement result, by controlling the output of the atomizing ultrasonic vibration mechanism 82 and the amount of dried gas to be supplied to the humidifying chamber 80 with the second flow rate adjustment mechanism 84.

<Humidifying Unit>

Figure 9:
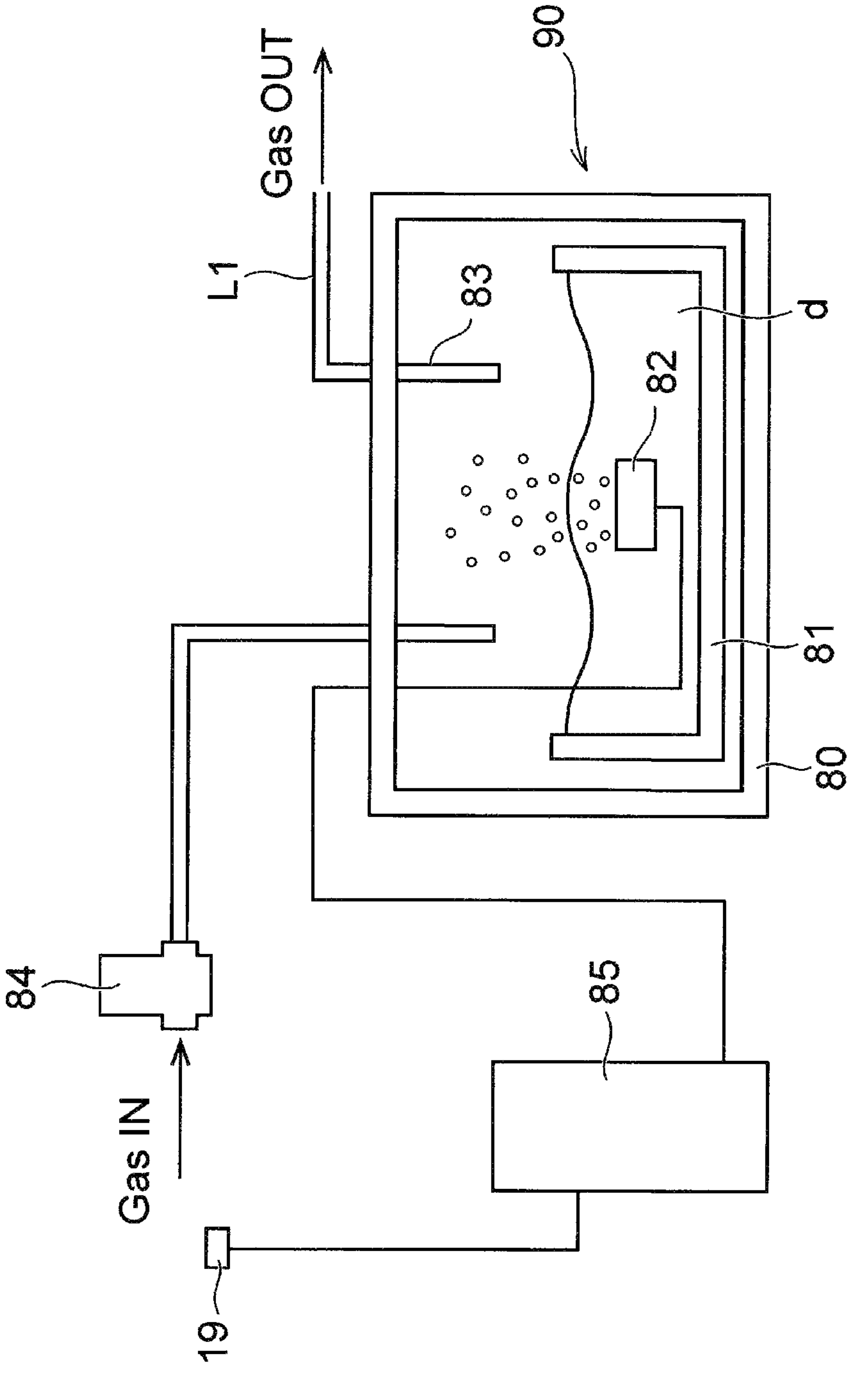
FIG. 9 is a diagram showing a humidification unit according to an embodiment of the present invention.

A humidifying unit according to the present invention will be explained. FIG. 9 is a schematic view of a humidifying unit 90 according to the present invention, which is used in the gas transfer type ultrasonic gushing fine powder quantitative feeding method or the gas transfer type ultrasonic gushing fine powder quantitative feeding system 70 as described above.

The humidifying unit 90 according to the present invention comprises a humidity measuring sensor 19 for measuring humidity of the casing space b in the housing 12 of the gas transfer type ultrasonic gushing fine powder quantitative feeding device 10, a humidifying chamber 80 for humidifying the carrier gas, and a humidified carrier gas feed nozzle 83 for feeding the humidified carrier gas to the device, wherein the humidifying chamber 80 comprises a water tank 81 that stores liquid d for humidifying the carrier gas, an ultrasonic vibration mechanism for atomizing the liquid d, a second flow rate adjustment mechanism 84 for controlling the amount of dried gas for supplying to the humidifying chamber 80, and a temperature control mechanism 85 for controlling humidity in the housing 12 in conjunction with the humidity measuring sensor 19.

The humidity control mechanism 85 adjusts the output of each constituting member which constitutes the humidifying chamber 80 in conjunction with the humidity of the casing space b in the housing 12 of the gas transfer type ultrasonic gushing fine powder quantitative feeding device 10 measured by the humidity measuring sensor 19, and adjusts the humidity and flow rate of the humidified carrier gas fed from the humidifying chamber 80 to the gas transfer type ultrasonic gushing fine powder quantitative feeding device 10, which makes it possible to maintain the humidity of the casing space b at a predetermined value.

<Control Portion>

Here, the gas transfer type ultrasonic gushing fine powder quantitative feeding system or humidification unit of the present invention may further comprise a control portion. The control portion may be connected to each constituting member such as the first flow rate adjustment mechanism 14, the position control device 17, the motor 25, the ultrasonic vibration mechanism 82, and the second flow rate adjustment mechanism 84, based on information obtained from the position detection sensor 16 and the humidity measuring sensor 19. This control portion may include the ultrasonic vibration controller 200 already described.

In one aspect of the present invention, the rotary drive unit 25 can rotate the rotary shaft 40 at a speed corresponding to the desired supply amount of the mixed fluid c by controlling the operation by the control portion.

In particular, in one aspect of the present invention, the feed nozzle driving unit 33 is controlled by the control portion based on the measurement result of the position detection sensor 16 to adjust the height of the feed nozzle 15 and the ultrasonic vibration driver 101 to at least the ultrasonic vibration gushing portion 102. The height is appropriately adjusted so that a part of the surface layer ZA of the fine powder a stored in the fine powder storage container 11 contacts the fine powder surface Z, furthermore, the control portion controls the rotary drive unit 25 and the ultrasonic vibration driver 101 to cause the ultrasonic vibration gutting portion 102 to ultrasonically vibrate at a predetermined frequency and amplitude, while changing the relative positional relationship in the lateral direction (reference rotation direction R) between the fine powder surface Z and the ultrasonic vibration gushing portion 102. This makes it possible to control the amount of fine powder a to be taken.

In one aspect of the present invention, the control portion may also have the function of the humidity control mechanism 85. The control portion adjusts the output of the ultrasonic vibration mechanism 82 and the amount of dry gas supplied to the humidification chamber 80 by the second flow rate adjustment mechanism 84, based on the measurement result of the humidity measurement sensor 19, so that the control portion can adjust the humidity of the humidified carrier gas supplied to the gas transfer type ultrasonic gushing fine powder quantitative feeding device 10.

The control portion can be configured by including, for example, a memory means that stores a control program and various storage information, and an arithmetic means that operates based on the control program. In order to calculate the feed amount of the humidified carrier gas to the gas transfer type ultrasonic gushing fine powder quantitative feeding device 10, the memory means previously obtains for example, the relationship between the humidity of the casing space b and the carrier gas feed speed, the relationship between the humidity of the casing space b and the output of the ultrasonic vibration mechanism 82, the relationship between the intake amount of the fine powder a in the fine powder storage container 11 to the feed nozzle 15 and the rotation speed of the rotary drive unit 25, by testing, etc. and memorize the calculated relational expression or correlation table.

The control portion can appropriately adjust the amount of the dried gas fed to the humidifying chamber 80, the output of the ultrasonic vibration mechanism 82, the supply amount of the humidified carrier gas fed from the feed port 13 to the housing 12, the amount of the mixed fluid c fed from the gas transfer type ultrasonic gushing fine powder quantitative feeding device 10 to the thermal spray device 20, and the like based on the relational expression or the correlation table so that the fine powder can be quantitatively and stably transferred and fed during transfer.

That is, for example, the fine powder supply system shown in FIG. 8 may have a gas transfer type ultrasonic gushing fine powder quantitative feeding system 70; and a thermal spraying device which is a fine powder application device 20 to which fine powder a, accompanied by the carrier gas from the feed nozzle 15 of the gas transfer type ultrasonic gushing fine powder quantitative feeding device 10 of the gas transfer type ultrasonic gushing fine powder quantitative feeding system 70, is supplied.

Furthermore, for example, in this fine powder supply system, the gas transfer type ultrasonic gushing fine powder quantitative feeding system 70 suppresses the occurrence of pulsation in the conveyance of the fine powder a conveyed in the carrier passage from the powder inlet 15A of the feed nozzle 15 to the thermal spraying device 20, when the gas transfer type ultrasonic gushing fine powder quantitative feeding system 70 supplies fine powder a to the thermal spraying device 20.

Therefore, the thermal spraying apparatus 20 forms a uniform thermal spray coating on a predetermined target while suppressing the generation of mottled patterns, by using fine powder a supplied from gas transfer type ultrasonic gushing fine powder quantitative feeding system 70.

Test Example

Figure 10:
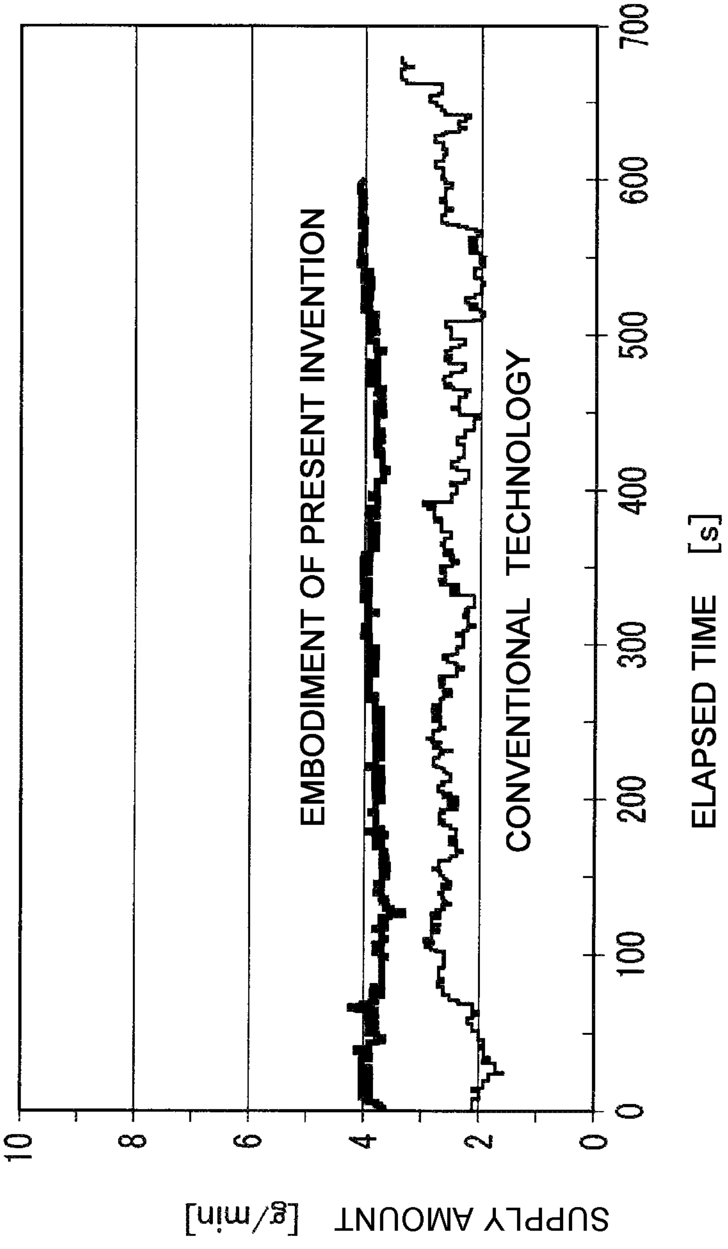
FIG. 10 is a diagram showing the relationship between the supply amount of fine powder and the elapsed time in test examples of the present invention and conventional technology.

Here, a test example of the gas transfer type ultrasonic gushing fine powder quantitative feeding system according to the embodiment having the configuration as described above will be described. FIG. 10 is a diagram showing the relationship between the supply amount of fine powder and the elapsed time in test examples of the present invention and conventional technology.

For example, as shown in FIG. 10, under the conditions that the flow rate of the carrier gas (N2) is 35 L/min and the average particle diameter of the fine powder (alumina) is 1 μm, for example, in the prior art gas transfer type ultrasonic gushing fine powder quantitative feeding device for adjusting the humidity of the carrier gas described in Patent Document 3, the ultrasonic vibration gushing portion is not applied. As a result, the amount of fine powder supplied is unstable even after a certain amount of time has elapsed in the feed nozzle carrier passage (urethane tube, inner diameter: @2.5 mm, length: 1 m), causing pulsation.

On the other hand, under the same conditions, in the gas transfer type ultrasonic gushing fine powder quantitative feeding device according to the embodiment of the present invention, by adjusting the humidity of the carrier gas and, for example, setting the ultrasonic vibration frequency of the ultrasonic vibration gushing portion to 40 kHz, it can be seen that the supply amount of fine powder is stable even after the specified elapsed time in the carrier passage (urethane tube, inner diameter: φ2.5 mm, length: 1 m) of the feed nozzle, and the occurrence of pulsation is suppressed.

As described above, according to the gas transfer type ultrasonic gushing fine powder quantitative feeding system, the gas transfer type ultrasonic gushing fine powder quantitative feeding method, and the device according to the embodiment of the present invention, fine powder having an extremely light mass can be quantitatively and stably transported to an apparatus using the fine powder.

Although the case where the fine powder is fed to the thermal spraying device has been described in the present embodiment, it is also possible to similarly apply to a fine powder using device such as a spacer spraying device of a liquid crystal substrate, powder compression molding, a sandblast device, or a powder coating device.

Modification

Here, the gas transfer type ultrasonic gushing fine powder quantitative feeding device 10 according to the above-described embodiment is not limited to the configurations shown in FIGS. 5 to 9, for example, a modification in which an additional configuration is added to the configuration of the gas transfer type ultrasonic gushing fine powder quantitative feeding device 10, or a part of the functions of the configuration of the gas transfer type ultrasonic gushing fine powder quantitative feeding device 10 is added or changed is also envisioned. Each assumed modification will be described below.

First Modification

Here, in the embodiment shown in FIGS. 5 to 9 already described above, the ultrasonic vibration gutting portion 102 of the gas transfer type ultrasonic gushing fine powder quantitative feeding device 10 includes the plate portion 102P in which the through hole 102B is formed as the passage region Q.

However, in this first modified example, the ultrasonic vibration gushing portion 102 of the gas transfer type ultrasonic gushing fine powder quantitative feeding device 10 may include a pipe portion having a pipe-like shape of the ultrasonic vibration gushing portion 102. Furthermore, the pipe portion has a pipe-shaped interior that connects the upper end and the lower end of the pipe portion in the vertical direction as a passage region Q.

In this case, in a state in which the lower end of the pipe portion is brought into contact with the fine powder surface and the relative positional relationship between the fine powder surface Z and the ultrasonic vibration gutting portion 102 in the lateral direction (the reference rotation direction R) is changed, the feed nozzle 15 takes in the fine powder a, that rises up from the upper end of the pipe section to the ultrasonic vibration gushing portion 102 through the inside of the pipe-shaped shape being the passage region Q, together with the carrier gas G from the powder inlet 10A of the feed nozzle 15, by ultrasonically vibrating the ultrasonic vibration gushing portion 102.

As a result, it is possible to crush the aggregated fine powder a in the fine powder storage container 11 and smooth the fine powder surface Z. Furthermore, it is possible to achieve highly accurate intake of the fine powder a into the feed nozzle 15 of the gas transfer type ultrasonic gushing fine powder quantitative feeding device 10.

Second Modification

Also, instead of the first modified example described above, in the second modified example, the ultrasonic vibration gushing portion 102 of the gas transfer type ultrasonic gushing fine powder quantitative feeding device 10 may include a net portion having a net-like shape penetrating between the upper surface and the under surface as a passage region Q.

In this case, in a state where the relative positional relationship in the lateral direction (reference rotation direction R) between the fine powder surface Z and the ultrasonic vibration gushing portion 102 is changed and the under surface of the net part of the ultrasonic vibration gushing portion 102 is brought into contact with the fine powder surface Z, the ultrasonic vibration gushing portion 102 is ultrasonically vibrated, so that the feed nozzle 15 takes in the fine powder a that rises up to the upper surface of the ultrasonic vibration gushing portion 102 through the relevant net as passage region Q, together with the carrier gas G, from the powder inlet 15A of the feed nozzle 15.

As a result, it is possible to crush the aggregated fine powder a in the fine powder storage container 11, smooth the fine powder surface Z, and take the fine powder a into the feed nozzle 15 of the gas transfer type ultrasonic gushing fine powder quantitative feeding device 10 with high accuracy.

Third Modification

Furthermore, in the above-described embodiments shown in FIGS. 5 to 9, the configuration in which the ultrasonic vibration gutting portion 102 of the gas transfer type ultrasonic gushing fine powder quantitative feeding device 10 ultrasonically vibrates has been described. However, another configuration of the gas transfer type ultrasonic gushing fine powder quantitative feeding device 10 may be ultrasonically vibrated to break up aggregated fine powder.

For example, in this third modified example, the gas transfer type ultrasonic gushing fine powder quantitative feeding device 10 may comprise an ultrasonic vibration smoothing unit that ultrasonically vibrates so as to smooth the fine powder surface Z of the surface layer ZA of the fine powder a stored in the fine powder storage container 11. The gas transfer type ultrasonic gushing fine powder quantitative feeding device 10 may further comprise an ultrasonic vibration driver (for example, an ultrasonic vibrator) for ultrasonically vibrating the ultrasonic vibration smoothing unit.

In this case, this ultrasonic vibration smoothing unit can be implemented, for example, by driving the already-described brush 62, scraper 60, or flap 61 shown in FIG. 7 so as to ultrasonically vibrate. Note that the ultrasonic vibration smoothing unit may have a plate-like shape.

That is, in this third modified example, the gas transfer type ultrasonic gushing fine powder quantitative feeding device 10 smoothes the fine powder surface Z and crushes the agglomerated fine powder a on the fine powder surface Z by ultrasonically vibrating the ultrasonic vibration smoothing unit, in a state where the relative position between the fine powder surface Z of the surface layer ZA of the fine powder a stored in the fine powder storage container 11 and the ultrasonic vibration smoothing unit is changed at least in the lateral direction (reference rotation direction R).

In particular, by rotating the fine powder storage container 11 with the rotary drive unit 25, the relative position in the lateral direction between the fine powder surface Z of the surface layer ZA of the fine powder a stored in the fine powder storage container 11 and the ultrasonic vibration smoothing unit is changed.

As a result, it is possible to crush the aggregated fine powder a in the fine powder storage container 11 and smooth the fine powder surface Z.

It should be noted that the fine powder quantitative feeder according to the third modification can be applied to the surface tracing method as described above.

Fourth Modification

Also, for example, in this fourth modification, the gas transfer type ultrasonic gushing fine powder quantitative feeding device 10 may crush the aggregated fine powder a contained in the fine powder storage container 11 by ultrasonically vibrating the fine powder storage container 11, in a state in which the fine powder a is stored in the fine powder storage container 11.

As a result, crushing of the aggregated fine powder a within the fine powder storage container 11 can be achieved.

It should be noted that the fine powder quantitative feeder according to the fourth modification can be applied not only to the surface tracing type but also to the local flow rate type.

Fifth Modification

Also, for example, in the fifth modification, the gas transfer type ultrasonic gushing fine powder quantitative feeding device 10 may further comprise an ultrasonic vibration nozzle driving unit for ultrasonically vibrating the feed nozzle 15.

Then, the gas transfer type ultrasonic gushing fine powder quantitative feeding device 10 ultrasonically vibrates the feed nozzle 15 with the ultrasonic vibrating nozzle driving unit. When the feed nozzle 15 takes in fine powder from the powder inlet 15A. As a result, the gas transfer type ultrasonic gushing fine powder quantitative feeding device 10 crushes the aggregated fine powder a by the feed nozzle 15, takes the fine powder in from the powder suction port 15A, and restrains re-agglomeration of the fine powder a taken in in the carrier passage of the feed nozzle 15.

In addition, in this fifth modification, the feed nozzle 15 may have a flat nozzle construction, the structure of the flat nozzle has a gas inlet provided adjacent to the powder inlet 15A for supplying a predetermined gas (carrier gas) into the housing 12.

In this case, the feed nozzle 15 discharges the carrier gas from this gas inlet, causes the fine powder to soar, and takes the soared fine powder and the carrier gas into the powder inlet 15A.

As a result, the fine powder a can be taken into the feed nozzle 15 of the gas transfer type ultrasonic gushing fine powder quantitative feeding device 10 with high accuracy, while preventing re-aggregation within the feed nozzle.

It should be noted that the gas transfer type ultrasonic gushing fine powder quantitative feeding device 10 according to the fifth modification can be applied not only to the surface tracing type but also to the local flow rate type and the capacity type.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE

1 Transferring tube
10 Gas transfer type ultrasonic gushing fine powder quantitative feeding device
11 Fine powder storage container
12 Housing
13 Feed port
14 First flow rate adjustment mechanism
15 Feed nozzle
15A Outlet
16 Position detection sensor
17 Position control mechanism
18 Lid
19 Humidity measuring sensor
20 Thermal spraying device
30 Cylinder body
31 Rod
32 Gripping portion
33 Feed nozzle driving unit (Driving mechanism)
40 Rotation axis
41 Rotary seat
60 Scraper
61 Flap
62 Brush
70 Gas transfer type ultrasonic gushing fine powder quantitative feeding system
80 Humidifying chamber
81 Water tank
82 Ultrasonic vibration mechanism
83 Humidified carrier gas feed nozzle
84 Second flow rate adjustment mechanism
85 Humidity control mechanism
90 Humidifying unit
L1 Carrier gas feed path
L2 Fine powder feed path (carrier passage)
a Fine powder
a" Deposited fine powder
b Casing space
C Mixed fluid
d Liquid
Z Fine powder surface
ZA Surface layer of fine powder stored in fine powder storage container
W Aggregated fine powder
Q Pass area R Reference rotation direction
G Carrier gas
101 Ultrasonic vibration driver
102 Ultrasonic vibration gutting portion
102A End part
102B Through hole
102P Plate part
102K Smoothing wall part
200 Ultrasonic vibration controller

The invention claimed is:

1. A gas transfer type ultrasonic gushing fine powder quantitative feeding system comprising:

a humidification chamber configured to humidify a carrier gas; and a gas transfer type ultrasonic gushing fine powder quantitative feeding device configured to quantitatively supply a mixed fluid of the carrier gas and fine powder to a fine powder using device, by supplying the carrier gas from the humidification chamber, wherein the gas transfer type ultrasonic gushing fine powder quantitative feeding device comprises:

a fine powder storage container configured to store the fine powder;

a housing configured to house the fine powder storage container in a gas-tight manner;

a feed port configured to supply the carrier gas to the housing;

a flow rate adjustment mechanism configured to adjust supply amount of the carrier gas to the housing;

a feed nozzle configured to have a powder inlet for taking in the fine powder and the carrier gas, to accompany the fine powder with the carrier gas from the fine powder storage container, and to supply the fine powder and the carrier gas to the fine powder using device;

a position detection sensor configured to detect a relative position between the feed nozzle and a fine powder surface of a surface layer of the fine powder stored in the fine powder storage container;

an ultrasonic vibration gutting portion configured to be placed at least below the powder inlet of the feed nozzle and to be capable of ultrasonic vibration, the ultrasonic vibration gutting portion having a passage region through which the fine powder can pass in the vertical direction;

a feed nozzle driving unit configured to vertically move the feed nozzle and the ultrasonic vibration gushing portion; and a humidity measurement sensor configured to measure a humidity in the housing, and wherein, in a state in which at least part of the ultrasonic vibration gushing portion is in contact with the fine powder surface of the surface layer of the fine powder stored in the fine powder storage container, the powder inlet of the feed nozzle takes in the fine powder rising from the fine powder surface onto the ultrasonic vibration gushing portion through the passage region of the ultrasonic vibration gushing portion, together with the carrier gas, by ultrasonically vibrating at least part of the ultrasonic vibration gutting portion.

2. The gas transfer type ultrasonic gushing fine powder quantitative feeding system according to claim 1, wherein, in the state that the relative positional between the fine powder surface and the ultrasonic vibration gutting portion relationship is changed in the lateral direction perpendicular to the vertical direction, the fine powder passing through the passage region from below to above the passage region in contact with the fine powder surface in the ultrasonic vibration gushing portion, so that the fine powder rises from the fine powder surface onto the ultrasonic vibration gushing portion, by ultrasonically vibrating the ultrasonic vibration gutting portion.

3. The gas transfer type ultrasonic gushing fine powder quantitative feeding system according to claim 2, further comprising an ultrasonic vibration driver arranged in the housing and ultrasonically vibrating the ultrasonic vibration gushing portion.

4. The gas transfer type ultrasonic gushing fine powder quantitative feeding system according to claim 3, wherein the ultrasonic vibration driver is an ultrasonic vibrator.

5. The gas transfer type ultrasonic gushing fine powder quantitative feeding system according to claim 4, further comprising a gripping part to which the ultrasonic vibration driver, the position detection sensor, and the feed nozzle are fixed.

6. The gas transfer type ultrasonic gushing fine powder quantitative feeding system according to claim 5, further comprising an ultrasonic vibration controller that controls the frequency and amplitude of vibration of the ultrasonic vibration gushing portion by controlling the operation of the ultrasonic vibration driver.

7. The gas transfer type ultrasonic gushing fine powder quantitative feeding system according to claim 6, wherein, in a state where at least part of the ultrasonic vibration gushing portion is in contact with the fine powder surface, the ultrasonic vibration controller controls the operation of the ultrasonic vibration driver so that the frequency at which the ultrasonic vibration gushing portion vibrates is 3 kHz or higher.

8. The gas transfer type ultrasonic gushing fine powder quantitative feeding system according to claim 3, further comprising a rotary drive unit configured to drive the fine powder storage container so as to rotate in the reference rotation direction with the vertical direction as the rotation axis, wherein a relative positional relationship between the fine powder surface and the ultrasonic vibration gushing portion in the reference rotation direction changes, by the rotary drive unit rotating the fine powder storage container in the reference rotation direction.

9. The gas transfer type ultrasonic gushing fine powder quantitative feeding system according to claim 8, wherein the ultrasonic vibration gutting portion includes a plate portion having a plate-like shape, wherein the plate portion is formed with a through hole penetrating vertically between the upper surface and the under surface of the plate portion as the passage region, and wherein, in a state in which the rotary drive unit rotates the fine powder storage container in the reference rotation direction, the feed nozzle driving unit vertically moves the ultrasonic vibration gushing portion so that the under surface side of the plate portion contacts the fine powder surface.

10. The gas transfer type ultrasonic gushing fine powder quantitative feeding system according to claim 9, wherein the plate part is made of metal, ceramics, or resin having a certain or higher rigidity.

11. The gas transfer type ultrasonic gushing fine powder quantitative feeding system according to claim 9, wherein the ultrasonic vibration gushing portion comprises a smoothing wall connected to the end of the plate part, wherein, in a state where the relative positional relationship between the fine powder surface and the ultrasonic vibration gushing portion in the reference rotation direction changes, the smoothing wall smoothes the fine powder surface of the surface layer of the fine powder, and the smoothing wall prevents the fine powder located on the surface of the fine powder from flowing from the lateral direction to the upper surface side of the plate portion.

12. The gas transfer type ultrasonic gushing fine powder quantitative feeding system according to claim 11, wherein, in a state in which the rotary drive unit rotates the fine powder storage container in the reference rotation direction and the ultrasonic vibration gutting portion is ultrasonically vibrated, the fine powder located on the upper surface side of the plate portion is taken in from the powder inlet of the feed nozzle together with the carrier gas.

13. The gas transfer type ultrasonic gushing fine powder quantitative feeding system according to claim 12, wherein the plate portion is connected to the ultrasonic vibration driver through the smoothing wall.

14. The gas transfer type ultrasonic gushing fine powder quantitative feeding system according to claim 2, wherein the ultrasonic vibration gushing portion includes a pipe part having a pipe-like shape, wherein the pipe portion has an interior having the pipe-shaped shape, as the passage region, is formed to connect the upper end and the lower end of the pipe portion in the vertical direction, and wherein, in a state in which the relative positional relationship in the lateral direction between the fine powder surface and the ultrasonic vibration gushing portion is changed while the lower end of the pipe portion is in contact with the fine powder surface, the feed nozzle takes in the fine powder, rising from the upper end of the pipe portion to the upper surface of the ultrasonic vibration gushing portion through the inside of the pipe-shaped shape which is the passage region, together with the carrier gas from the powder inlet of the feed nozzle, by ultrasonically vibrating the ultrasonic vibration gutting portion.

15. The gas transfer type ultrasonic gushing fine powder quantitative feeding system according to claim 2, wherein the ultrasonic vibration gutting portion includes a net portion having a net-like shape penetrating between the upper surface and the under surface as the passage region, and wherein, in a state in which the relative positional relationship in the lateral direction between the fine powder surface and the ultrasonic vibration gushing portion is changed while the under surface of the net portion is in contact with the fine powder surface, the feed nozzle takes in the fine powder, rising to the upper surface of the ultrasonic vibration gushing portion through the net portion which is the passage region, together with the carrier gas from the powder inlet of the feed nozzle, by ultrasonically vibrating the ultrasonic vibration gutting portion.

16. The gas transfer type ultrasonic gushing fine powder quantitative feeding system according to claim 2, wherein the fine powder has an average particle size of 3 μm or less.

17. The gas transfer type ultrasonic gushing fine powder quantitative feeding system according to claim 1, wherein the fine powder is powder made of spinel, titanium oxide, yttria, tungsten carbide, copper, zinc, nickel, or alumina.

18. The gas transfer type ultrasonic gushing fine powder quantitative feeding system according to claim 1, wherein the humidification chamber comprises:

a water tank containing a liquid configured to humidify the carrier gas;

an ultrasonic vibration mechanism configured to atomize the liquid; and a humidity control mechanism configured to control the humidity in the housing in conjunction with the humidity measurement sensor.

19. A device comprises:

the gas transfer type ultrasonic gushing fine powder quantitative feeding system described in claim 17; and a thermal spraying device, which is the fine powder using device, configured to be supplied with the fine powder entrained in the carrier gas, from the feed nozzle of the gas transfer type ultrasonic gushing fine powder quantitative feeding device of the gas transfer type ultrasonic gushing fine powder quantitative feeding system, wherein the gas transfer type ultrasonic gushing fine powder quantitative feeding system supplies the fine powder to the thermal spraying device, so as to suppress the generation of pulsation in conveying the fine powder conveyed in the carrier passage from the powder inlet of the feed nozzle to the thermal spraying device, and wherein the thermal spraying equipment forms a uniform thermal spray coating on the object while suppressing the generation of mottled patterns, by using the fine powder supplied from the gas transfer type ultrasonic gushing fine powder quantitative feeding system.

20. A gas transfer type ultrasonic gushing fine powder quantitative feeding method that uses a gas transfer type ultrasonic gushing fine powder quantitative feeding system comprising: a humidification chamber configured to humidify a carrier gas; and a gas transfer type ultrasonic gushing fine powder quantitative feeding device configured to quantitatively supply a mixed fluid of the carrier gas and fine powder to a fine powder using device, by supplying the carrier gas from the humidification chamber, wherein, in the method, the gas transfer type ultrasonic gushing fine powder quantitative feeding device comprises:

a fine powder storage container configured to store the fine powder;

a housing configured to house the fine powder storage container in a gas-tight manner;

a feed port configured to supply the carrier gas to the housing;

a flow rate adjustment mechanism configured to adjust supply amount of the carrier gas to the housing;

a feed nozzle configured to have a powder inlet for taking in the fine powder and the carrier gas, to accompany the fine powder with the carrier gas from the fine powder storage container, and to supply the fine powder and the carrier gas to the fine powder using device;

a position detection sensor configured to detect a relative position between the feed nozzle and a fine powder surface of a surface layer of the fine powder stored in the fine powder storage container;

an ultrasonic vibration gutting portion configured to be placed at least below the powder inlet of the feed nozzle and to be capable of ultrasonic vibration, the ultrasonic vibration gutting portion having a passage region through which the fine powder can pass in the vertical direction;

a feed nozzle driving unit configured to vertically move the feed nozzle and the ultrasonic vibration gushing portion; and a humidity measurement sensor configured to measure a humidity in the housing, and wherein, in a state in which at least part of the ultrasonic vibration gushing portion is in contact with the fine powder surface of the surface layer of the fine powder stored in the fine powder storage container, the powder inlet of the feed nozzle takes in the fine powder rising from the fine powder surface onto the ultrasonic vibration gushing portion through the passage region of the ultrasonic vibration gushing portion, together with the carrier gas, by ultrasonically vibrating at least part of the ultrasonic vibration gutting portion.

* * * * *